United States Patent [19]

Elko et al.

[11] Patent Number: 5,493,668
[45] Date of Patent: Feb. 20, 1996

[54] MULTIPLE PROCESSOR SYSTEM HAVING SOFTWARE FOR SELECTING SHARED CACHE ENTRIES OF AN ASSOCIATED CASTOUT CLASS FOR TRANSFER TO A DASD WITH ONE I/O OPERATION

[75] Inventors: David A. Elko, Poughkeepsie; Jeffrey A. Frey, Fishkill, both of N.Y.; Chandrasekaran Mohan, San Jose, Calif.; Inderpal S. Narang, Saratoga, Calif.; Jeffrey M. Nick, Fishkill, N.Y.; Jimmy P. Strickland, Saratoga, Calif.; Michael D. Swanson, Poughkeepsie, N.Y.

[73] Assignee: International Business Machines Corporation, Armonk, N.Y.

[21] Appl. No.: 860,806

[22] Filed: Mar. 30, 1992

Related U.S. Application Data

[63] Continuation-in-part of Ser. No. 629,315, Dec. 14, 1990, abandoned.

[51] Int. Cl.[6] ............................. G06F 12/02; G06F 13/00
[52] U.S. Cl. .................. 395/457; 395/440; 395/200.08; 364/228.1; 364/243.41; 364/246.3; 364/243.7
[58] Field of Search ..................................... 395/425, 275, 395/250, 200; 364/200

[56] References Cited

U.S. PATENT DOCUMENTS

| | | | |
|---|---|---|---|
| 4,317,168 | 2/1982 | Messina et al. | 395/250 |
| 4,441,155 | 4/1984 | Fletcher et al. | 364/200 |
| 4,445,174 | 4/1984 | Fletcher | 364/200 |
| 4,603,382 | 7/1986 | Cole et al. | 395/250 |
| 4,636,946 | 1/1987 | Hartung et al. | 364/200 |
| 5,113,514 | 5/1992 | Albonesi et al. | 395/425 |
| 5,142,627 | 8/1992 | Elliot et al. | 395/275 |
| 5,163,148 | 11/1992 | Walls | 395/600 |
| 5,386,546 | 1/1995 | Hamaguchi | 395/425 |

*Primary Examiner*—Thomas C. Lee
*Assistant Examiner*—Marc K. Weinstein
*Attorney, Agent, or Firm*—Bernard M. Goldman

[57] ABSTRACT

A high-speed cache is shared by a plurality of independently-operating data systems in a multi-system data sharing complex. Each data system has access both to the high-speed cache and the lower-speed, secondary storage for obtaining and storing data. Management logic and the high-speed cache assures that a block of data obtained form the cache for entry into the secondary storage will be consistent with the version of the block of data in the shared cache with non-blocking serialization allowing access to a changed version in the cache while castout is being performed. Castout classes are provided to facilitate efficient movement from the shared cache to DASD.

35 Claims, 24 Drawing Sheets

FIG. 4A
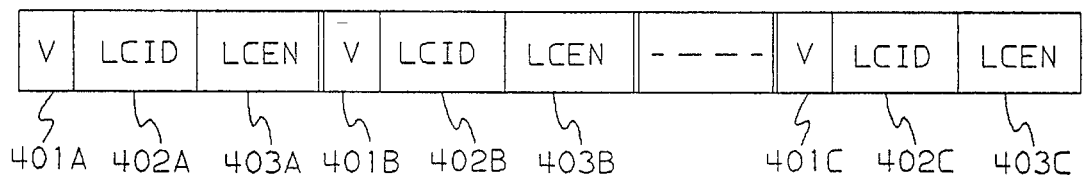
FIG. 4B
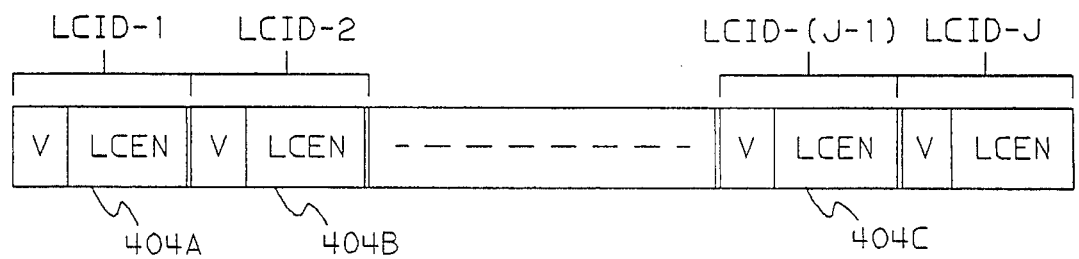
FIG. 8
DIRECTORY-ENTRY INFORMATION BLOCK
| NAME | CHANGE INDICATOR | CASTOUT CLASS | CASTOUT LOCK | |
|------|------------------|---------------|--------------|--|

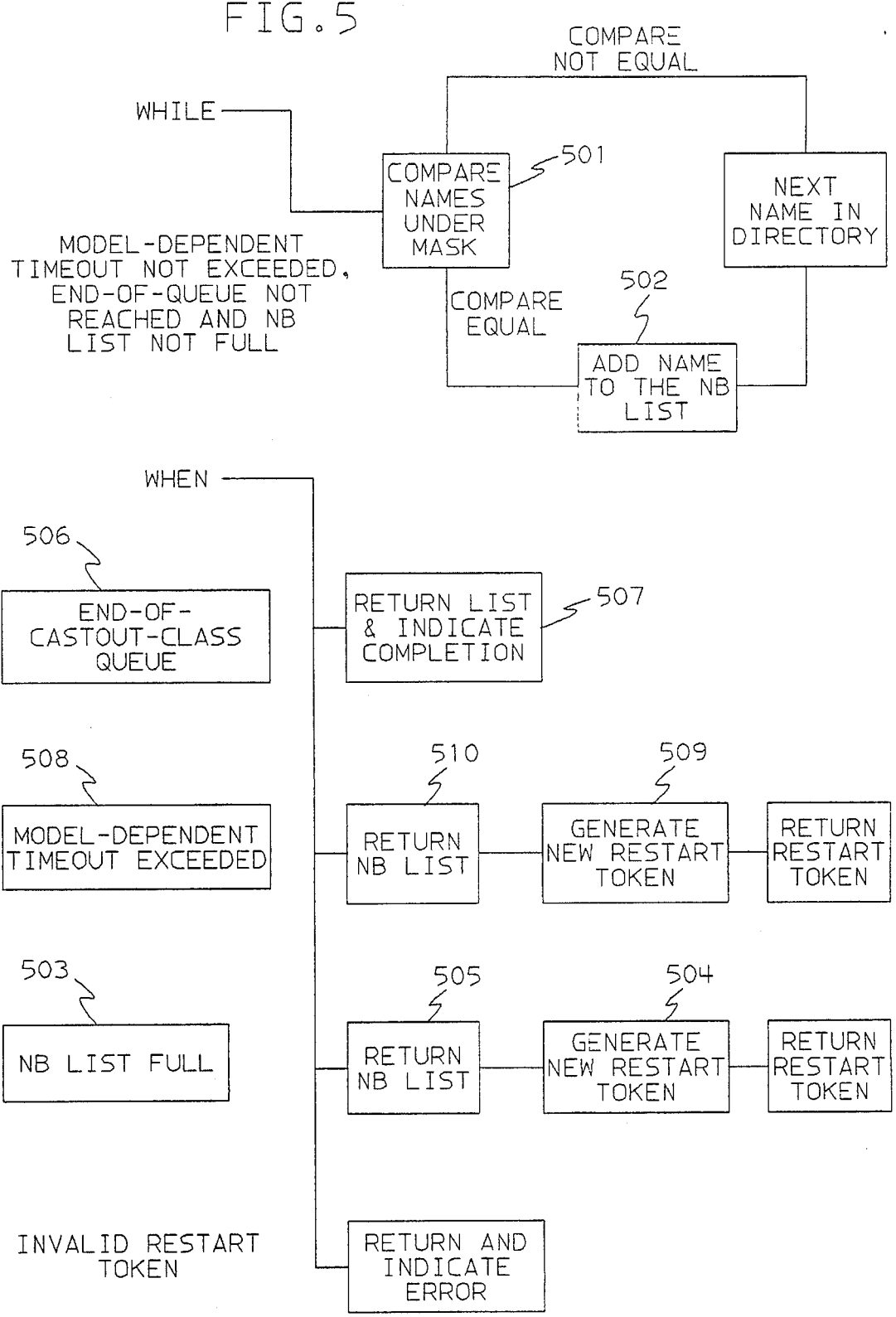

FIG. 7
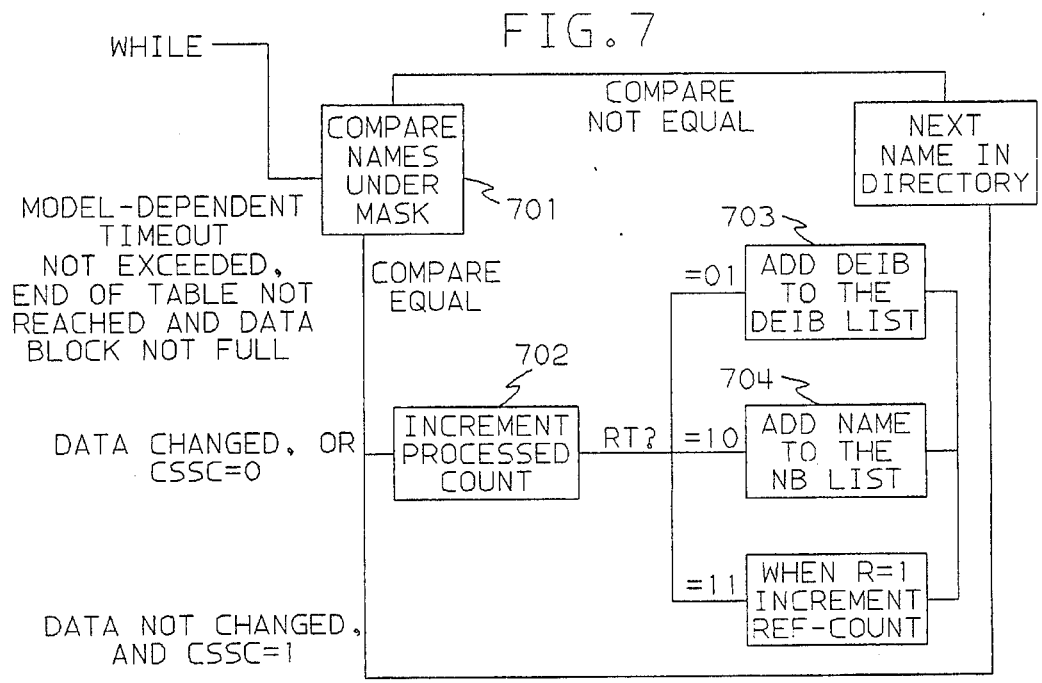
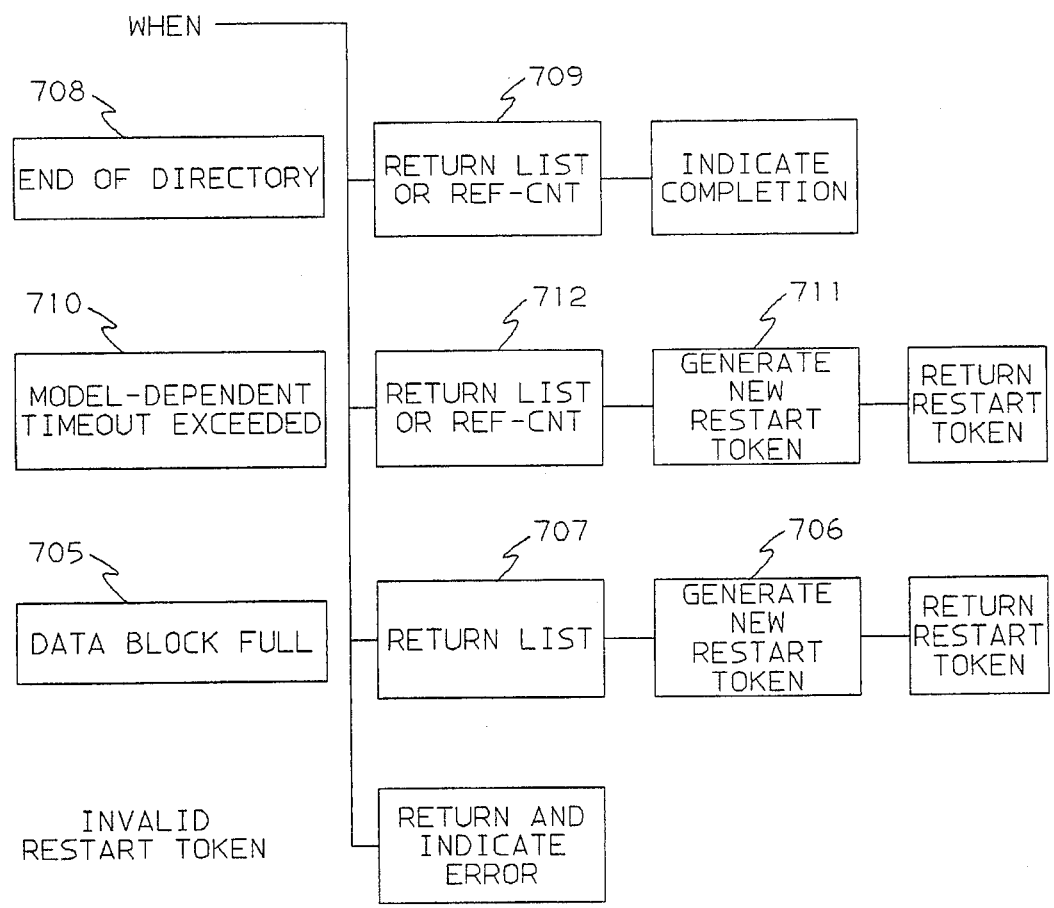

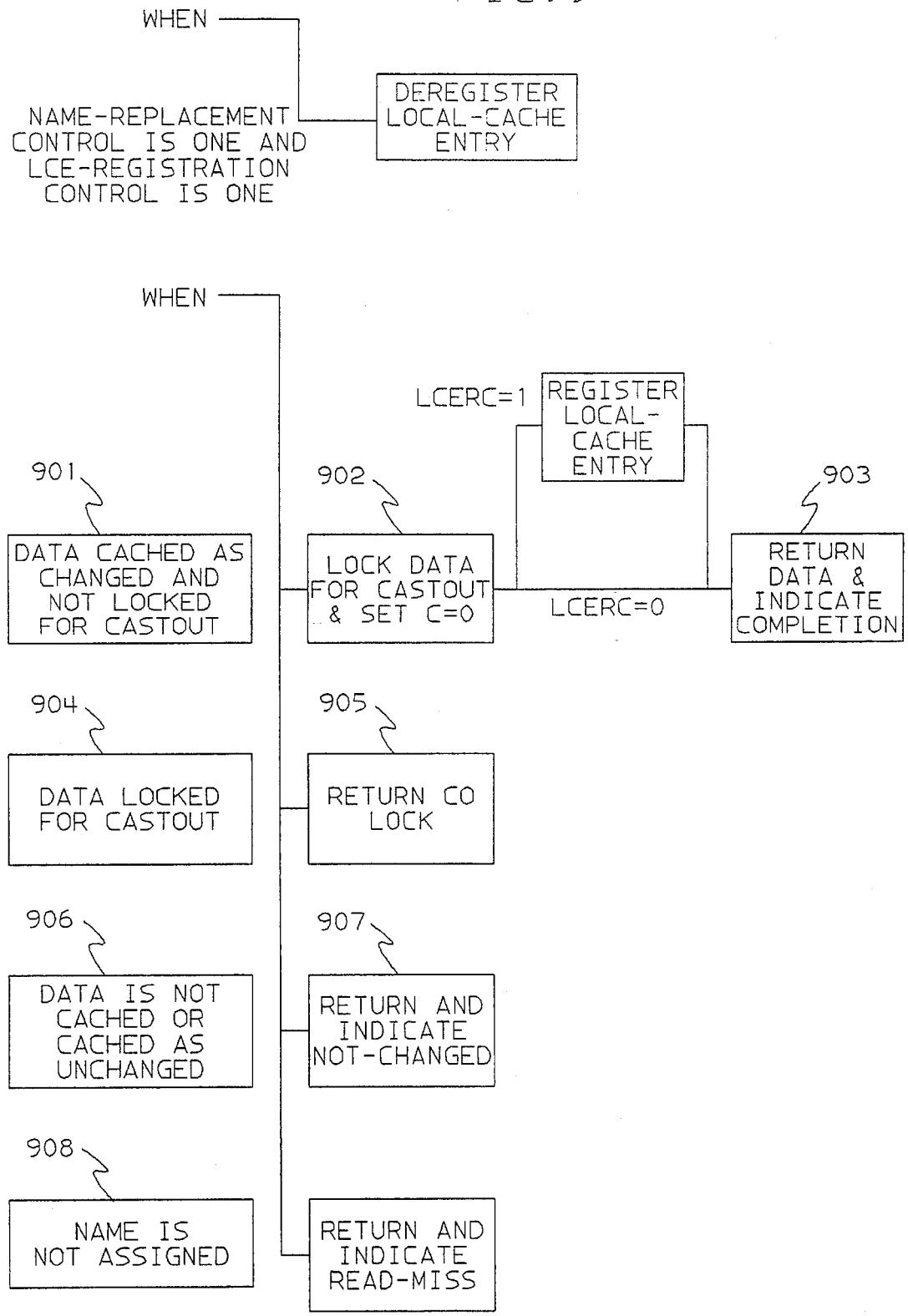

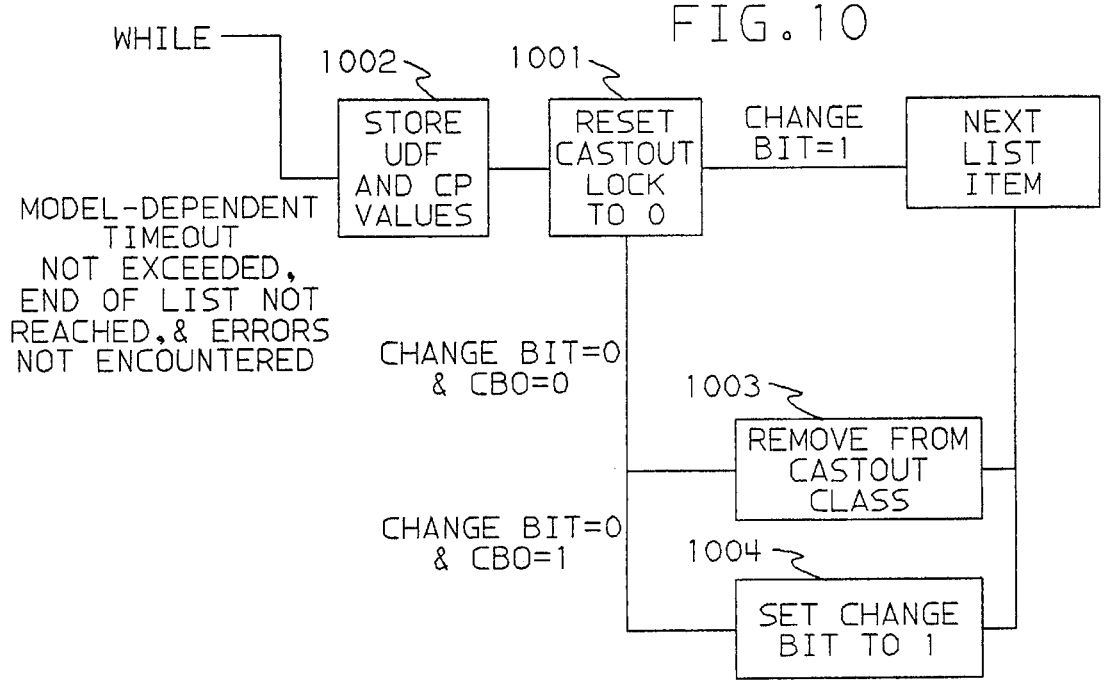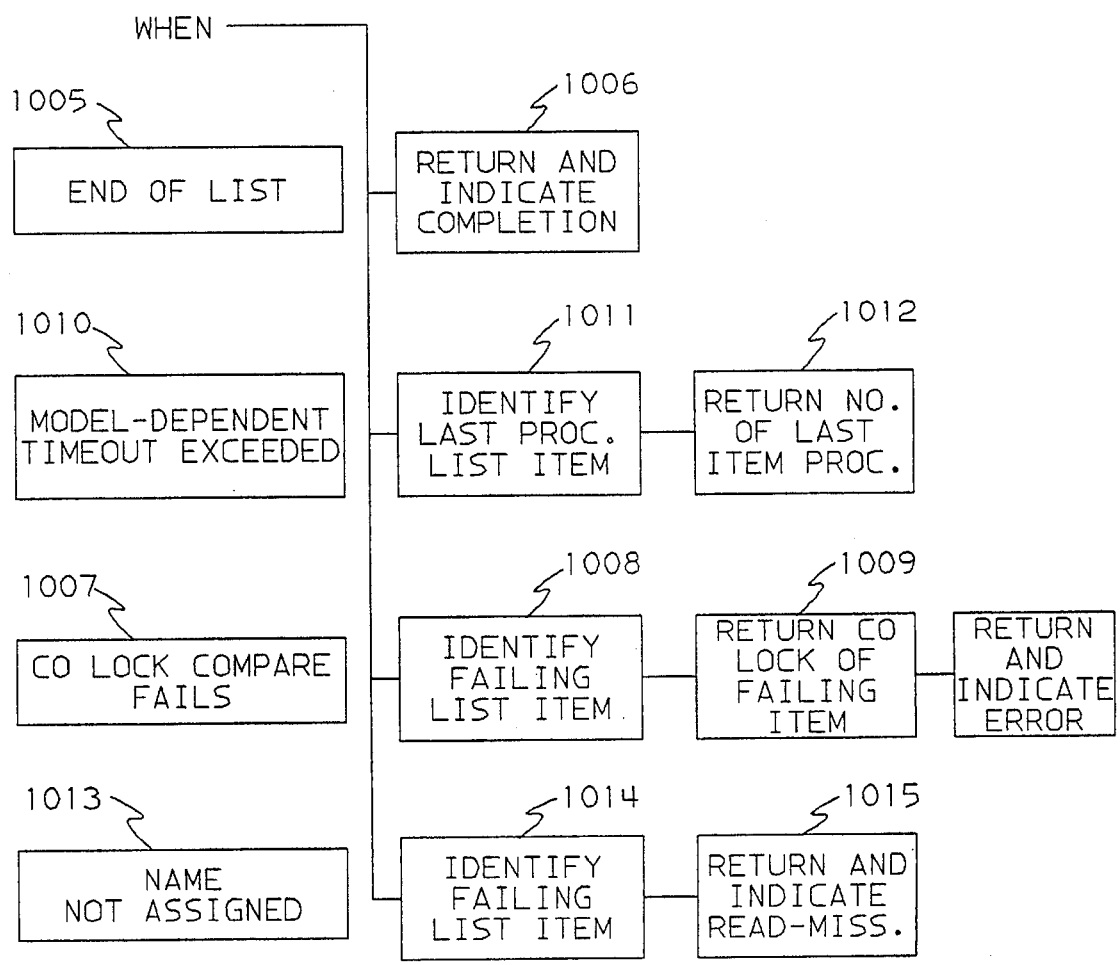
FIG. 10

MULTIPLE PROCESSOR SYSTEM HAVING SOFTWARE FOR SELECTING SHARED CACHE ENTRIES OF AN ASSOCIATED CASTOUT CLASS FOR TRANSFER TO A DASD WITH ONE I/O OPERATION

This application claims the priority date of Dec. 14, 1990, for the matter disclosed in a prior U.S. application Ser. No. 07/629,315, filed Dec. 14, 1990, by C. Mohan et al and entitled "Non-blocking Serialization for Removing Data From A Cache" which is a pending unissued application at the time of filing of this application. The contents of prior application Ser. No. 07/629,315, abandoned, is carried into this application which is a continuation-in-part of prior application Ser. No. 07/629,315, abandoned; and both applications have at least one invention in common.

CROSS REFERENCE TO RELATED APPLICATIONS

This application contains subject matter which is related to the subject matter of the following applications which are assigned to the same assignee as this application:

"Configurable, Recoverable Parallel Bus" by N. G. Bartow et al, Ser. No. 08/071,146, pending Filed: Feb. 20, 1992; "High Performance Channels For Data Processing Systems" by N. G. Bartow et al, Pat. No. 5,412,803; and "Frame-Group Transmission And Reception For Parallel/Serial Buses", by N. G. Bartow et al, Pat. No. 5,267,240.

Specifications Incorporated by Reference:

The entire specifications of the following listed applications are completely incorporated by reference as part of the subject application. Each of the following listed applications is owned by the same assignee as the subject application, is filed on the same day as the subject application, and has the same priority date as the subject application. They are:

"Communicating Messages Between Processors And A Coupling Facility" by D. A. Elko et al, Ser. No. 08/420,893, pending; "Sysplex Shared Data Coherency Method and Means" by D. A. Elko et al, Ser. No. 07/860,805, pending; "Method and Apparatus For Distributed Locking of Shared Data, Employing A Central Coupling Facility" by D. A. Elko et al, Pat. No. 5,339,427; "Command Quiesce Function" by D. A. Elko et al, Pat. No. 5,339,405; "Storage Element For A Shared Electronic Storage Cache" by D. A. Elko et al, Ser. No. 07/860,807, pending; "Command Retry System" by D. A. Elko et al, Pat. No. 5,392,397; "Integrity Of Data Shared Between Caches Over A Link" by D. A. Elko et al, Pat. No. 5,331,673; "Management Of Data Objects Used To Maintain State Information For Shared Data At A Local Complex" by J. A. Frey et al, Pat. No. 5,388,266; "Recovery Of Data Objects Used To Maintain State Information For Shared Data At A Local Complex" by J. A. Frey et al, Pat. No. 5,394,542; "Message Path Mechanism For Managing Connections Between Processors And A Coupling Facility" by D. A. Elko et al, Ser. No. 08/324,447, pending; "Method And Apparatus For Notification Of State Transitions For Shared Lists of Data Entries" by J. A. Frey et al, Pat. No. 5,390,328, "Method And Apparatus For Performing Conditional Operations on Externally Shared Data" by D. A. Elko et al, Ser. No. 08/383,532; pending "Apparatus And Method For List Management In A Coupled Data Processing System" by J. A. Frey et al, Pat. No. 5,410,695, "Interdicting I/O And Messaging Operations In A Multi-System Complex" by D. A. Elko et al, and "Method And Apparatus For Coupling Data Processing Systems" by D. A. Elko et al, Pat. No. 5,317,739.

Introduction

In a data processing system comprised of a plurality of operating systems supporting attachment to shared DASD and a shared electronic storage facility, data is to be shared and managed on disk, in a cache contained in the shared electronic storage facility, and in local processor storage. Managing the movement of data between DASD and the shared electronic storage must address the problems of: insuring continued access to the data while it is being moved between locations; optimizing use of the shared electronic storage such that data having the most frequent reference remains resident in the facility; providing means of moving modified data from the shared electronic storage facility to DASD efficiently so as to avoid congestion either at the facility or at the I/O subsystem including the DASD.

In particular, this invention relates to increasing system efficiency in reliably moving a cache version of a block of data to secondary storage after being updated in a multi-system, data sharing complex.

Background

Typically, prior hardware caches in a processor comprise a storage array having fixed-size data blocks. Such storage is viewed by the hardware as a linear array of blocks. The blocks of data in the cache are managed by a cache directory, which invalidates or casts data blocks in or out of such cache based on LRU (least recently used) storage references. Well-known types of hardware caches are used in a central processing units (CPUs), and in a DASD (direct access storage devices).

In a database system wherein a plurality of independently-operating computer systems share data, global locking is required to maintain coherency of data in the different systems. A. J. van de Goor, in COMPUTER ARCHITECTURE AND DESIGN, Addison Wesley, 1989, discusses the data coherency problem as one in which sharing data among a proliferation of processors raises the possibility that multiple, inconsistent copies of data may exist because of multiple paths to the data and because of opportunities to locally modify the data.

Solutions to the data coherency problem have been proposed. All are based essentially on the existence of a global lock on data retrieved from a central location. Assuming pagination of data, one computer system of a multi-computer system which shares data stored on a disk acquires a global lock on a page of data and obtains and updates the page. The lock signifies to the other computer systems that the page has been acquired for updating. Prior to releasing the lock on the page, the computer system holding the lock writes the page to the disk, after which it generates and sends a message to the other computer systems to invalidate any copies of the page which may be held in their local cache. The lock on the page is not released until acknowledgement is received from every other computer system having access to the page. A solution similar to this is described in detail in Pat. Nos. 4,399,504 and 4,965,719, which are assigned to the assignee of this patent application and are incorporated herein by reference. A commercial product available from the assignee of this application and which incorporates this solution is the IMS/VS system with the data sharing feature.

The prior art global locking system provides great advantage in maintaining data coherency. However, the overhead penalties inherent in it include the requirement for performing an I/O procedure when a page is updated and undertaking message exchange after the I/O procedure in order to notify the other systems and release the lock.

When used in a non-data-shared single system case, the global-locking prior art incurs extra overhead in maintaining data coherency (consistency) between transactions by implementing a commit policy requiring each transaction which updates data to write the modified data, together with log records, to storage before the transaction is fully committed. This requires one I/O procedure per page for each modifying transaction, which increases overhead costs.

In contrast, the IBM DB2 in the single system non-data-sharing case follows a policy which does not require an I/O process to write an updated page back to storage in order to commit a transaction. If the protocol described above is used in a data-sharing situation where a plurality of computer systems access one or more data storage sites, the performance could degrade significantly because of the required write back to storage and message delay. In this regard, see C. J. Date's discussion of concurrency at pages 593–595 in Vol. I of AN INTRODUCTION TO DATABASE SYSTEMS, Addison-Wessley, 1986.

In a multi-computer, data-sharing system which includes multiple levels of storage, it is contemplated that a secondary level of storage would consist of one or more direct access storage devices (DASD's) which are shared by independently-operating computer systems. Typical nomenclature for hierarchally-arranged storage systems classify DASD and other such storage facilities as "secondary" storage. In this regard, secondary storage includes all facilities from which data must be moved to "primary" storage before it can be directly referenced by a CPU. See Detiel, OPERATING SYSTEMS, Second Edition, 1990, by Addison Wesley. It is further contemplated that caching techniques would be useful to provide a high-speed, frequently-accessed storage for shared data. For various reasons, data would be entered into a shared cache by the database systems after acquisition from DASD's. In this regard, a shared cache would be included in a primary level of storage for a multi-computer, data-sharing system.

In such a structure, a potential hazard would exist if one computer system obtained a block of data from the shared cache for the purpose of writing it to the DASD at the same time that the same block of data is obtained from the shared cache by another computer system, modified, and returned to the shared cache. In this situation, it is assumed that the retrieval of the modified block of data from the shared cache for storage in the DASD is referred to as "casting out" of the block. Castout requires that the page being cast out be read from the shared memory, written to DASD, and then marked as unchanged in the shared memory.

For efficient cache management of the shared cache, it is required that shared blocks of data be cast out periodically or based on thresholds of changed blocks in the cache. Once a block is cast out, it is marked as unchanged and becomes a candidate for deletion from the cache. A significant danger arises when the casting out is conducted by one computer system as some second computer system writes a new version of the page to the shared memory during the interval between the read and delete operations. The danger is that the delete will erase the new version of the block. Higher level locking or serialization and queuing in the shared cache are typically used to ensure that this does not happen. The problem with higher level locking is that it doubles the cost for removing the page from the cache because it requires two more multi-system interactions, that is lock and unlock. It will also delay the writing of the modified version by the second system which would produce undesirable performance consequences.

The term "class" has previously been used in record processing control, such as in the VM/370 spool file class for controlling printing, punching and networking operations. However, it has never been known to have been used in relation to any SES device to control castout processing under CPC control.

SUMMARY OF THE INVENTION

Sysplex Hardware Structure:

FIG. 1 shows a representation of a sysplex system. It contains a plurality of computer processing complexes (CPCs) from CPC-1 to CPC-M which represent any number of CPCs from one to a large number, all being connected to one or more SES (shared electronic storage) device (of which one SES device 101 is shown in FIG. 1).

Each CPC is of the type shown in FIG. 2, which may be a multiprocessor such as the presently commercial IBM ES/9000 model 900 which is designed according to the IBM ESA/390 architecture specified in the Enterprise Systems Architecture (ESA)/390 Principles of Operations (POP), which is orderable from IBM by form number SA22-7201-00, and is incorporated herein by reference in its entirety. Each CPC has one or more operating systems. If any CPC has more than one operating system, its resources must be logically partitioned among plural operating systems in using the IBM PR/SM feature. Inter-system channels (ISCs) are connected between SES (101) and CPCs 1 through M. An ISC connecting to a CPC communicates signals to/from microcode/hardware in the CPC.

Each CPC in the sysplex operates with a storage hierarchy, which for example may include a private high-speed hardware cache in each CPU of a CPC (201-1 and 201-N), a shared hardware cache accessible to all of the private processor caches (202), a main storage (MS) shared by all processors in the CPC (204), a hardware storage area (HSA) associated with MS but not having MS addressability (205). However, the DASD is grouped by DASD controls that allow any CPC in the sysplex to access any DASD in the group, which is referenced herein by the term "sysplex DASD" (207).

The CPC/SES physical connection (208) may be provided by a respective channel connected at one end to an MS controller in a respective CPC, and connected at its other end to a SES device. The respective channel bus may be made of a serial optical fibers. The bus may be a single fiber, but it may be made of a plurality of fibers operating in parallel by "striping" (interleaving) data among them.

In a hardware sense, a SES may be considered to be a large random access memory that may be used in common by all CPCs connected to the SES. The connected CPCs may use the SES to store shared data records and files on a temporary or semi-permanent basis. Hence, SES may be considered to be a component of the storage hierarchy in the system, having a hierarchy level common to all CPCs attached to the SES, and roughly corresponding to the Expanded Store (ES) level in the CPCs.

In a sysplex using this invention, one or more SES entities may be physically connected to the MS/ES in every CPC in the sysplex. It is not required that all CPCs in a sysplex be connected to a SES. For example, a SES may be attached only to a subset of CPCs operating the same programming subsystem. And different subsets of CPCs may be connected to different SESs in a sysplex for running different programming subsystems.

A fundamental feature in this invention is using SES as a high-speed cache for data normally stored in the sysplex common DASD, although the CPC/SES/DASD physical connections may not be in a direct hierarchical path. Any CPC in the sysplex can access a record much faster from SES than it can from the common DASD storage. That is, a data element or record can be quickly accessed in SES without the electro-mechanical delays found with DASD, such as waiting for head movement between tracks and waiting for track spin to reach a requested DASD record.

Special commands are provided to allocate the SES cache. Also, a plurality of caches may be allocated within the same SES, such as having a respective cache handle the data shared by attached subsets of CPCs using different programs.

Each SES cache includes a directory (102), data area (103), local cache register (104), and cache controls (105). If the data area part of the cache is not going to be used, it may be made zero in size. Each valid directory entry in a SES cache contains a name of a data element registered in SES by any of its attached CPCs. SES may or may not contain a copy of the data in the registered element. The SES registered name is also the name of one or more copies of the data element in one or more CPCs in the sysplex. Furthermore, this directory name also identifies a copy of the data element stored in (or about to be stored in) one of the DASDs 1–K in the bank of DASD connected to director 207.

A primary object of this invention is to provide a method and structure in a shared data, multi-computer system which guarantees that any page of data in a shared cache (aka SES) which is being cast out prior to deletion will not result in deletion of a later version of the page written to the shared memory (aka SES) while the castout operation is in progress.

A significant advantage of the invention is that it does not require higher level locking or serialization and queuing mechanisms in a shared memory to guarantee consistency between page versions when removing a page from the shared memory for entry into secondary storage (DASD).

An important object of this invention is to provide a method for operating a multi-system, data-sharing complex in which data is cached in a shared electronic memory (aka SES). In a multi-system, data-sharing complex, a database system executing on a first computer system could be reading a modified page in a shared cached as a first step to write the page to secondary storage while another database system could be trying to cache an even more recently updated version of the same page in the shared cache. The invention detects such a condition and, without a blocking mechanism such as locking, bars deletion of the updated copy of the page from the cache after the first computer system has stored the prior version in secondary storage.

This invention involves a sysplex using a plurality of operating systems (OSs). Any CPC in the sysplex may have its resources logically partitioned among a plurality of different OSs to provide a multiplicity of independent OSs within a single CPC, such as by the IBM processor resource/ system management (PR/SM) system. Thus a sysplex may have any mix of OSs running on its different CPCs, some CPCs each having one OS, and other CPCs each having a plurality of OSs running independently of each other. One or more subsystems may be running under any OS in any CPC, including the IBM DB2, DFP, IMS, VSAM, etc. subsystems.

Different copies of the same data base subsystem program may be running simultaneously and independently in the different CPCs. With this invention, these different programs may be accessing the same or different data elements or records in the data base, which may simultaneously be in MS/ES local caches (LCs) of the different CPCs.

It is a primary object of this invention to provide for managing the movement of data between DASD and the shared electronic storage while addressing the problems of: insuring continued access to the data while it is being moved between locations; optimizing use of the shared electronic storage such that data having the most frequent reference remains resident in the facility; providing means of moving modified data from the shared electronic storage facility to DASD efficiently so as to avoid congestion either at the facility or at the I/O subsystem including the DASD.

A key innovation of this invention is a technique for operating a shared cache that does not require any additional serialization mechanisms such as higher-level locking to guarantee that a more recent version of a page is not deleted from the cache while an earlier version is written to secondary storage. The cache is accessed by a directory containing a directory entry for each page stored in the cache. Critical to the invention is the provision of a castout lock field in the directory entry for each page in the cache which contains the identification of a computer system currently performing a castout operation. This field operates in conjunction with a change field used to indicate whether the page has been changed. If the change field indicates that the page has been changed during an ongoing castout operation, it prevents deletion of the page, thereby preserving the latest version of the page in the shared cache for a following castout operation. The invention operates by allowing castout only if the castout field is zero, indicating that no castout is in progress, and by deleting a page only if both the castout ID and change bit fields are zero. The invention requires an addition of an operation to the normal read/write set of operations; namely a "read" for cast out operation that enters the identification of the requestor into the castout ID field and sets the change field to zero.

SES Structure:

The SES cache is a structure in SES consisting of a collection of data-area elements, a directory, and local cache controls. A SES cache structure is created at the request of programs accessing data shared among CPCs where those programs require coherency and integrity for locally cached copies of data items.

SES Directory:

A SES cache directory is an essential component of a SES device for obtaining SES coherency control. Having a SES data area with a SES cache enhances sysplex performance, but is optional. Without a SES data area, the data records in the sysplex would be accessible only from the sysplex DASD. The data base software operations would lose the performance provided by fast access to shared records in a SES data area. The SES local cache register (associated with SES directory entries) would still identify which CPC LCBs in the sysplex have copy(s) of a shared data data element.

SES Local Cache Register:

Entries in the local cache register identify the attached local caches which contain copies of the data element identified by the associated directory entry. Each entry in the local cache register provides sufficient information to locate the cache coherency vector associated with the local cache and the local cache entry within the coherency vector used to represent the validity of locally cached copies of the data element.

Processing Flow Overview:

The SES-cache storage is normally smaller than the DASD storage. Thus, periodically the changed data must be transferred from the SES cache to the backing DASD. This process, called castout, is controlled by the program and involves the following operations:

A SES-read operation is issued that sets the castout serialization and copies the data block to main storage.

An I/O operation is executed that copies the data block to DASD.

A SES-unlock operation is issued that releases the castout serialization.

Related data items are maintained in castout classes by the SES cache. Castout classes are used to improve the efficiency of the castout process by enabling the program to batch data transfers to DASD in a single I/O operation. The processes which perform the movement of data between DASD and the SES cache are the subject of this invention.

Objects within the SES directory which enable efficient castout processing include:

Castout Class (CCL) A two-byte value which identifies the castout class assigned for the name.

Castout Lock (CO) A two-byte value which indicates the castout state of the data. When the castout lock is zero the data is not being castout. When the castout lock is not zero, the value of the first byte of the castout lock identifies the local cache that is casting out the data block from the SES cache to DASD. The value of the second byte identifies the castout process on the local system. When the castout lock is not zero, the data bit must be one.

Change Bit (C) A one-bit value which, in conjunction with the castout lock, indicates the changed state of the data. When the change bit is one, the data is cached as changed. When the change bit is zero and the data is not locked for castout, the data is either not cached, or is cached but not changed. When the change bit is zero and the data is locked for castout, the data is cached as changed. Whenever the data is in the changed state, the most recent version of the data resides in the cache. When the change bit is one, the data bit must also be one.

The castout process may be initiated in one of several ways including:

Event-driven castout: Counts of changed data elements are compared after each write operation. This triggers castout processing for the specified castout class at the time the write command occurs and defined thresholds are exceeded. The comparison is part of the processing of the transaction.

Timer-driven castout: A set of counters is requested at timed intervals. The comparison is part of a background program and is not part of any transaction processing. A balance between responsiveness to castout processing and transaction overhead in obtaining the counts must be maintained.

Commands at the SES in support of the castout process include:

Read Castout Class: The read-castout-class command returns a list of name blocks to main storage. Directory entries are processed when the name field matches the input name under the mask condition and the directory entry is queued to the specified castout-class queue.

Read Castout-Class Information: The read-castout-class-information command returns statistics for a range of castout classes.

Read Directory: The read-directory command scans the directory and returns a list of directory-entry-information blocks.

Read For Castout: The read-for-castout command returns the contents of a named data area to the local cache and locks the name for castout.

Unlock Castout Locks: The unlock-castout-locks command resets the castout lock to zero and stores the user-data field in the directory entry for a list of names.

Write and Register: The write-and-register command stores the contents of the data block in the data area and registers the local-cache entry when the change control is compatible with the change state of the data.

Write When Registered: The write-when-registered command stores the contents of the data block in the data area, provided the name is assigned in the directory, the local-cache entry is registered, and the change control is compatible with the change state of the data.

During mainline operation, the data base manager is responsible for managing the storage of the SES cache. The data base manager is also responsible for managing the migration of changed data elements from the SES cache to DASD. The time out interval established during initialization causes the operating system to give control to processing routines on a periodic basis for management of SES cache storage and migration of SES cache data to DASD. The facilities described above provide the base on which management of data movement between DASD and a SES cache is performed by system software. Techniques which use these primitive services to implement a non-blocking serialization protocol between write and castout of data from SES are utilized. Additionally, primitive services described provide the base for determining the set of modified data elements to be moved from a SES to DASD in a manner which optimizes the overall performance of the coupled systems environment.

An example of one protocol for managing the movement of data from the SES cache to DASD is as follows. The read castout class information command is issued for each cast out class and candidate castout classes are selected. The read castout class command is issued for each selected castout class. A list of least recently updated directory entries is returned. The read for castout command is issued for each selected directory entry. I/O requests are built to cause the data read from SES to be written to DASD. When the I/O operations have completed, the unlock castout locks command is issued.

BRIEF DESCRIPTION OF THE DRAWINGS

FIGS. 4A and 4B represent a preferred form of an entry in a SES local cache register (LCR).

FIG. 5 provides a flow diagram that represents a read castout class command.

FIG. 7 provides a flow diagram that represents a read directory command.

FIG. 8 shows the format of the directory-entry information block (DEIB).

FIG. 9 provides a flow diagram that represents a read for castout command.

FIG. 10 provides a flow diagram that represents a unlock castout locks command.

DETAILED DESCRIPTION OF THE PREFERRED EMBODIMENT

Overview:

The invention provides the structure of a multi-system data sharing complex including a shared cache in the form of a non-volatile electronic memory (aka SES) and a method for operating the cache for sharing data resources while maintaining coherency among several, possibly different, versions of the data.

Figure 1:
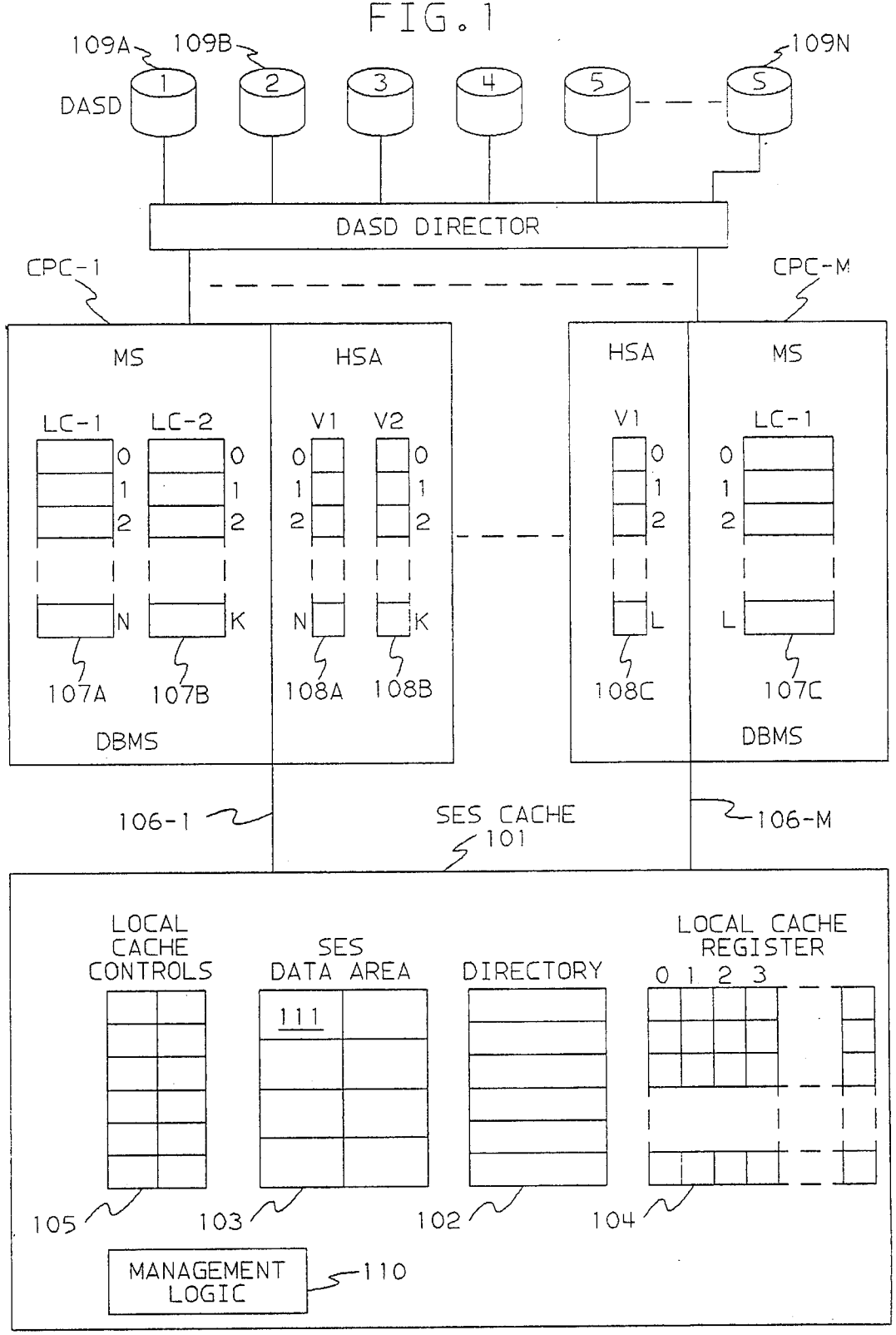
FIG. 1 represents a sysplex system with a plurality of CPCs and a SES device.
Figure 2:
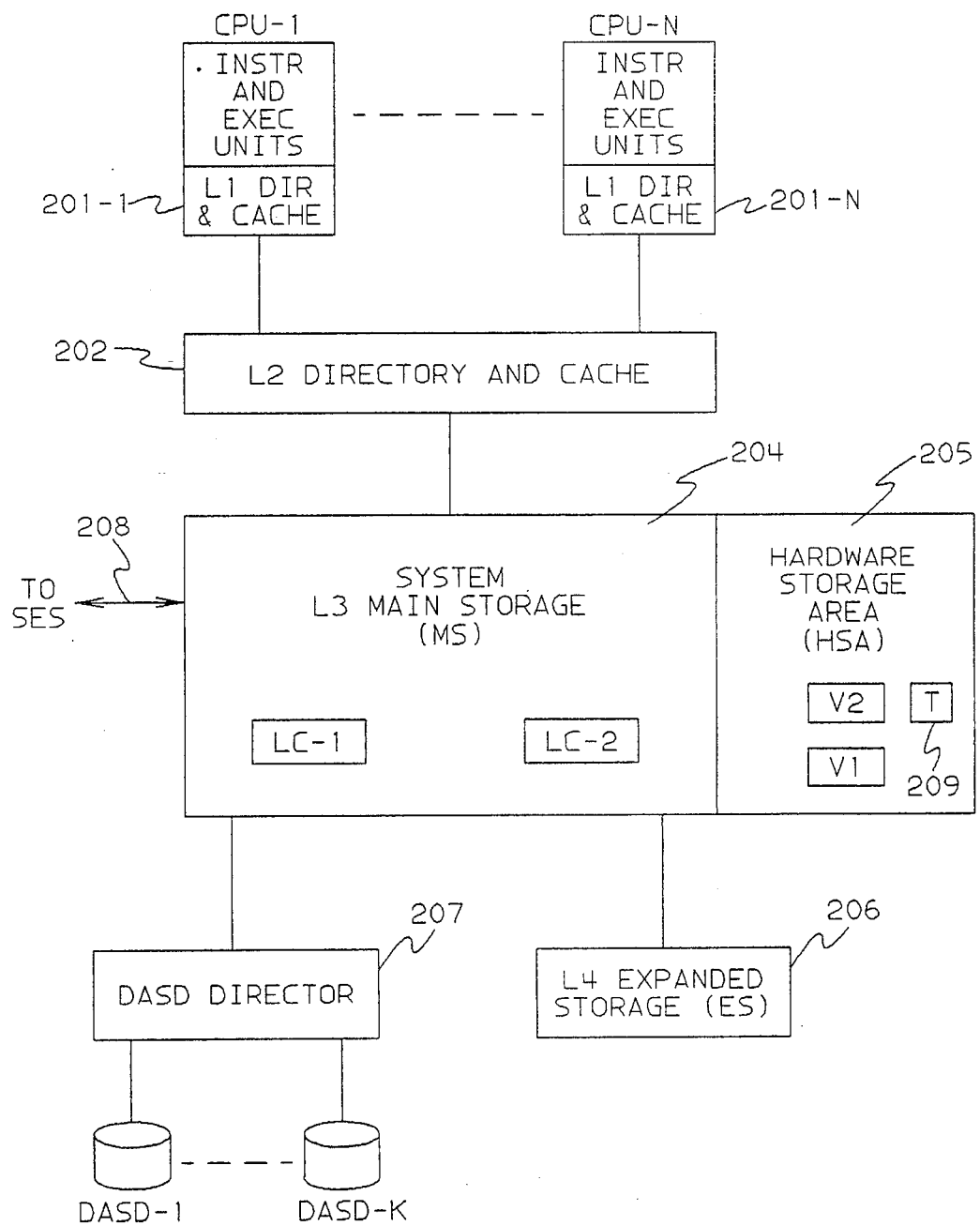
FIG. 2 represents a single CPC (computer processor complex) as may be found in the prior art.

If a data coherency policy in a multi-computer, data-sharing system requires writing of an updated page, an architecture with certain significant characteristics can be used. Such an architecture is illustrated in FIG. 1 and includes a plurality of independently-operating computer systems CPC-1 through CPC-M which share data stored on direct access storage devices (DASD) 109A, 109B, through 109N. The DASD's 109A, 109B, through 109N can comprise, for example, multi-disk disk drives. Characteristically, this is referred to as "secondary storage". The architecture includes M computer systems, CPC-1 through CPC-M, each including a database management system (DBMS) which controls creation, organization, and modification of a database comprehending data on the DASD's and which controls access to the data in the database. Also provided in the system is a high-speed non-volatile electronic memory (SES at 101) which functions as a cache shared by the computer systems. The memory (101) is attached with high-speed links 106-1 through 106-M to the computer systems CPC-1 through CPC-M. Hereinafter, the memory 101 is referred to as either "the memory" or "NV-store" or "SES".

When comparing access to the memory 101 with access to secondary storage, it is asserted that the memory 101 is a relatively high-speed semi-conductor memory. Further, the attachment of the memory 101 to the computer systems is by way of, for example, fiber optics communication channels which provide very high speed data transfer. Relatively speaking, an I/O operation is conducted at the relatively high-speed memory 101 while, as is known, I/O with relatively lower-speed DASD's can take tens of milliseconds.

The memory 101 includes management logic 110, preferably in the form of a processor which manages all memory storage operations. The management logic 110 can comprise, for example, a high performance processor with a local program store and private memory, rendering the management logic device capable of engaging in message-based memory access transactions with the computer systems CPC-1 through CPC-M.

Respecting the computer systems CPC-1 through CPC-M, these entities can comprise, for example, like IBM/3090 Systems, each including a multi-processor architecture with a private cache, and each capable of supporting a database management system of the IMS/VS or DB2 type.

Substantially, the invention is practiced in the data sharing complex illustrated in FIG. 1 and described above. In the memory 101, is found a semi-conductor memory designated as a shared cache 103. The shared cache 103 can comprise conventional, multi-port, high-speed, random access memory which is preferably non-volatile. The shared cache 103 is used for storage of blocks of data. For example, the shared cache 103 can be used to store pages of data, where one such page is indicated by 111.

The management logic 110 within SES comprises one or more processors, or micro-processors, and their programs, or micro-programs, executable by the processors, which receive messages sent by the CPC commands for executing the commands in SES The local cache controls (105) and directory (102) are accessed by the management logic 110. Well-known hashing lookup algorithms can be used for accessing a SES cache directory. The local cache controls is a data structure containing a plurality of entries, each entry identifying a computer system which has connected operationally to the memory 101. Assuming, for example, that the computer systems CPC-1, . . . CPC-M have connected, they will be listed in the local cache controls 105.

The shared cache 103 is operated as a "store-in" cache, as opposed to a "store-through" cache. In this regard, a "store-in" cache is one into which updated pages can be written without the requirement that those pages be written simultaneously into ("stored-through to") secondary storage.

A SES cache is a component of a three-level storage hierarchy in a network of attached processors. The lowest level of the hierarchy is DASD, the intermediate level is the SES-cache and the highest level is the local cache in processor storage. The DASD and SES cache are shared by the processors and are accessed by I/O operations and message operations, respectively. Local cache(s) may be defined in each processor and is accessed using CPU instructions.

Data that moves through the storage hierarchy is named. The data sizes are variable with the range of variability between 1 and 16 times the data-area element size. The data-area element sizes are fixed for each SES cache and are powers of 2 with a minimum size of 256 bytes. The names are 16-byte values assigned by a programming protocol. The data is permanently resident in the DASD storage.

Copies or new versions of the data may also reside in any combination of SES-cache storage or local-cache storage. In particular, a data object may reside in SES-cache storage, but not in any local cache, it may reside in SES-cache storage and a subset of local caches or it may reside in a subset of local caches but not in the SES-cache storage.

Figure 3:
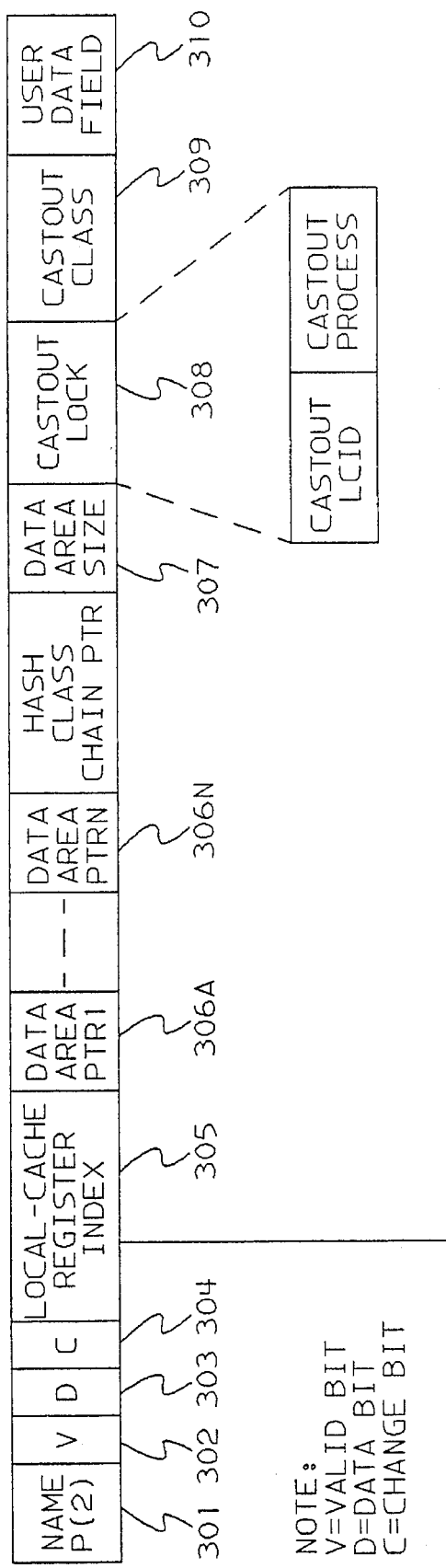
FIG. 3 represents a preferred form of an entry in the SES directory.

As an example, assume data elements being referenced in the storage hierarchy are pages. Then, a page cached in the shared cache 103 is identified by a software-assigned name. Therefore, any requests for reading or writing in the shared cache 103 are required to specify the name of the page (P) which is the object of a request. The directory 102 is conventionally indexed by the names of pages which are objects of READ or WRITE commands. A representative entry in the directory 102 is shown in FIG. 3. In respect of the invention being described, the fields of the directory which are relevant are shown in FIG. 3. These include a name field 301, a data bit (D) field 303, a data area pointer field 306A through 306N, a change bit (C) field 304, a valid bit (V) field 302, a data area size field 307, a castout lock identification (CO) field 308, a castout class field 309, and a local cache register index (305) providing access to a local cache register entry shown in FIG. 4. The local cache register entry contains identification of a local cache attached to the SES cache (402A through 402C) and valid bits (401A through 401C). Two examples are shown providing different types of entries in a local cache register 305.

Continuing the example, the page name field 301 is the field by which the management logic 110 indexes into the directory 102. Assume that the management logic 110 receives a READ or WRITE command, either of which would be accompanied by a value for a parameter P identifying a page. Management logic 110 subjects the value for P to a hashing process which generates a value used by the logic to access the directory quickly via the page name, if it already exists. Once the page name field has been located, the page address field 306 is used to point to the address in the shared cache of the identified page.

The management logic 110 creates, manages, and deletes directory entries as necessary. These activities are conducted using known mechanisms, although the precise structure of entries in the directory 102 is unique to this invention. The management logic 110 is also conventionally structured to obtain data from, and enter data into, the shared cache 103, although according to read and write operations which are unique to this invention. The management logic 110 also includes the usual cache management capability to generate "cache miss" and "cache hit" responses. These responses are generated in response to commands submitted by the computer systems connected to the shared cache 111. A "cache miss" indicates that an identified data element (e.g. page) does not reside in the shared cache 111, while a "cache hit" indicates that an identified data element (e.g. page) is in the cache 111.

Commands are generated by the computer systems in the multi-system complex of FIG. 1. These commands elicit responses from the management logic 110. The inventors contemplate that commands and responses are exchanged between a computer system and the management logic by a message protocol. Further, the inventors contemplate that access to the shared cache 101 is synchronous in that any computer issuing a command may maintain a delay until a response is received from the management logic 110. The speed of the semi-conductor memory forming the shared cache 101 reduces the delay inherent in a synchronous message passing structure.

The inventors also contemplate that the computer systems of the multi-system data sharing complex in FIG. 1 obtain access to DASD's using conventional means, for example, the shared disk capability of an IBM IMS-like system. As is known, such access is asynchronous in that a computer system will not delay while a READ or WRITE command is dispatched to a DASD.

As FIG. 1 illustrates, the NV-store 101 is not attached directly to any secondary storage device. In this regard, the DBMS of each of the computer systems CPC-1 through CPC-M is aware of the existence of the NV-store 101 and is responsible for what is cached in it. In the system of FIG. 1, an updated data element (e.g. page) is written to the NV-store explicitly by a DBMS.

It is asserted that responsibility for maintaining stealable pages in the NV-store 101 is delegated to a single one of, or shared collectively by, the DBMS's executing on the computer systems. Management of the page space in the NV-store to ensure availability for new pages is undertaken by periodically writing updated pages from the NV-store to a secondary storage device by castout operations. Preferably, the castout operation is asynchronous to the transaction commit operation since it is desirable to have multiple updates to a data element (e.g. page) before it is written to secondary storage.

As FIG. 1 illustrates, each computer system includes an identified buffer which is used to stage data exchanged between the computer system and the NV-store 101. For example, the computer system CPC-1 includes a buffer 107A, while buffer 107C is provided in the computer system CPC-M. It is asserted that all computer systems of the data sharing complex possess such private buffers. Further, whenever one of the computer systems provides a READ or WRITE command to the management logic 110, it sends an address in its private buffer where the requested data is to be entered or obtained.

The invention concerns the casting out of data from the shared cache to secondary storage while permitting the updating of the data being cast out. When updated, the data element (e.g. page) is considered "dirty" until it is consistent with its updated version in secondary storage. When the change bit is 0 in the directory entry for a data element (e.g. page), the page is referred to as a "clean page". In this regard, the DASD version of the page is the same as the version of the page in the shared cache 101. In contrast, when the change bit (C) for the page is 1, the page is "dirty" and its cached version deviates from (is more recent than) its version in secondary storage.

The invention depends upon a set of unique commands and the registration in affected directory entries of changes resulting from execution of those commands.

Local Cache:

A local cache (LC) is defined to the SES-support facility on the CPC containing the local cache as described in Pat. No. 5,388,266. CPU instructions initialize controls in the SES-support facility and assign a local-cache token. The sizes of the local caches may vary between systems. Each local cache contains one or more local cache buffers (LCBs) 107.

SES Cache:

The SES cache is a structure in SES consisting of a collection of data-area elements and a directory. It is designated by a structure identifier. The SES cache is created by an allocate-cache-structure command. The command is issued by an initialization procedure at a processor which determines the attributes of the SES cache: size and number of data-area elements, number of directory entries, number of storage classes, and number of castout classes.

A local cache is attached to the SES cache by the attach-local-cache command that initializes controls in the SES facility and builds a set of paths over which the SES cache issues generated commands to the SES-support facility. A local cache is attached to a SES cache so that it may participate in the storage hierarchy. Coherency of copies of the data in the local caches and in the SES cache is maintained by controls in the SES cache and enforced by cross-invalidate commands issued as generated commands to the various SES-support facilities. The processes for cache coherency are described in patent application Ser. No. 07/860,805 pending.

SES-Cache Directory:

The SES-cache directory is a collection of directory entries arranged as an associative array. The directory entries are partitioned into storage classes. The subset of changed directory entries is partitioned into castout classes. Whenever a named data object is placed in the higher two levels of the hierarchy, its state and location is registered by the SES-cache directory. State information indicates whether the data is changed, unchanged, or locked for castout. Location information includes whether the data is resident in the SES-cache storage and which local caches contain a copy. The record (located in the SES cache data area by pointers in locations 406A-N) is herein referred to by any of several different terms: record, data element, data item, block, page, etc.. Certain SES-read and SES-write commands register She local-cache copy in the SES-cache directory. SES-write and SES-invalidate commands remove the registration of local copies.

Local-Cache-Entry Valid State:

When the data is located in the local cache, the state of :he data is either valid or invalid. The valid state of local cache entries is maintained by controls in the SES-support facility. The data is validated by CPU instructions and is invalidated by the invalidation process associated with SES-write and SES-invalidate operations. The valid state of the data is tested by a CPU instruction. A valid named data object must be registered in the SES-cache directory. Local-cache coherency is maintained by the invalidation process. The processes which use these controls to maintain coherency of data are described in patent application Ser. No. 07/860,805 pending.

Castout Process:

The SES-cache storage is normally smaller than the DASD storage. Thus periodically the changed data must be transferred from the SES cache to the backing DASD. This process, called castout, is controlled by the program and involves the following operations:

A SES-read for castout operation is issued that sets the castout serialization and copies the data block to main storage.

An I/O operation is executed that copies the data block to DASD.

A SES-unlock operation is issued that releases the castout serialization.

Related data objects are maintained in castout classes by the SES cache. Castout classes are used to improve the efficiency of the castout process by enabling the program to batch data transfers to DASD in a single I/O operation. The processes which perform the movement of data between DASD and the SES cache are the subject of this invention.

Reclaiming Process:

The least recently used unchanged data and directory resources are reclaimed by the SES cache when needed to meet new requests. The data objects are mapped into one of several storage classes by the program. Each storage class has a reclaiming vector that controls the reclaiming process. This allows the allotment of SES storage among the storage classes to be dynamically adjusted to account for changes in workload characteristics. The reclaiming vector is initialized by the program. The processes which utilize these SES cache storage management objects are the subject of patent application Ser. No. 07/860,807 pending.

Instrumentation:

Instrumentation information is provided to the program to assist in both the allocation of data across storage classes and in the castout process.

Cache Structure:

A set of cache-structure objects is established for each SES-cache structure. The cache-structure objects consist of:

Cache controls

Directory

Castout-class controls

Cache Controls

Maximum Castout Class (MCC):

A two-byte unsigned binary integer that specifies the number of castout classes. Valid castout-class values range from one to the maximum-castout-class value.

LCID Vector (LCIDV):

A bit string with an initial value of zero. The bit positions start at 0 and increase sequentially. The bit at position (i) in the string is set to one when a local cache is attached with an LCID value of (i). When the bit is one, the local-cache identifier is assigned. The bit at position (i) is reset to zero when the local cache is detached and LCID unassignment is requested or when the cache structure is deallocated. When the bit is zero, the local-cache identifier is not assigned.

Local-Cache Controls:

The Local-cache controls are initialized when a local cache is attached to the SES cache and are deleted when the the local-cache identifier is unassigned. The local-cache controls are valid when the local-cache identifier is assigned.

Directory:

The directory is the repository of state and location information for the SES and attached local cache(s). Each named data block that appears in the SES cache has an associated directory entry. The directory entries are arranged as an associative array and are accessed by using the value of the name field.

The directory-entry fields (FIG. 3) are summarized as follows:

Castout class

Castout lock

Change bit
Data bit
Data area size
Local-cache register
Name
Valid bit
User-data field
Castout Class (CCL) (309):

A two-byte value which identifies the castout class assigned for the name.

Castout Lock (CO) (308):

A two-byte value which indicates the castout state of the data. When the castout lock is zero the data is not being castout. When the castout lock is not zero, the value of the first byte of the castout lock identifies the local cache that is casting out the data block from the SES cache to DASD. The value of the second byte identifies the castout process on the local system. When the castout lock is not zero, the data bit must be one.

Change Bit (C) (304):

A one-bit value which, in conjunction with the castout lock, indicates the changed state of the data. When the change bit is one, the data is cached as changed. When the change bit is zero and the data is not locked for castout, the data is either not cached, or is cached but not changed. When the change bit is zero and the data is locked for castout, the data is cached as changed. Whenever the data is in the changed state, the most recent version of the data resides in the cache. When the change bit is one, the data bit must also be one.

Data Bit (D) (303):

A one-bit value which indicates whether the data is located in the SES cache. When the data bit is one, the data is cached. When the data bit is zero, the data is not cached.

Data-Area Size (DAS)

A five-bit unsigned binary integer that specifies the size of the data area as an integral multiple of the data-area-element size. The initial value is zero when the directory entry is assigned and is zero until the data bit is set to one.

Local-Cache Register (LCR) (FIG. 4):

The local-cache register is a table containing information on the location of the locally cached copies of the data block. Each row in the table corresponds to a directory entry. The columns in FIG. 4A contain the local-cache identifier (402A, 402B, 402C) and a valid bit (401A, 401B, 401C) for the local-cache-entry number.

FIG. 4B illustrates one embodiment for the local cache register (LCR) structure. The entry includes j number of LCID fields, in which j is the maximum number of local caches which can attache to the SES cache in the sysplex. Each entry in the LCR contains a valid bit (v). The v bit is set to one if the field represents an LCID. If v is zero, the field does not represent any LCID value.

The LCID values are assigned by operating system software when a request is made to connect a local cache to the SES cache. Entries in the LCR are ordered by LCID value. Valid fields for LCID 1 are in the first LCR entry location, valid fields for LCID 2 are in the second LCR entry location, and so forth through valid and LCEN fields for LCID j.

Name (N) (301):

The name contains a 16-byte value specified by the program when the named data object is registered in the cache.

Valid Bit (V) (302):

A one-bit field which indicates the valid state of the directory entry. The two possible values are: 0 invalid; 1 valid. The directory entry is initialized to the invalid state. When in the invalid state the directory entry is available for assignment to a name. The valid state indicates that the name is assigned and the remaining fields in the directory entry are valid.

User-Data Field (UDF) (310):

The user-data field contains an eight-byte value that is associated with the data when it is initially changed in the SES cache and is maintained until the data-table entry is reused. The user-data field is valid when the data is cached as changed.

Castout-Class Controls:

The castout-class controls are summarized as follows:

Castout-class count (CCC)

Castout-class queue (CCQ)

Castout-Class count (CCC):

A four-byte unsigned binary integer associated with a castout class. Its value indicates the number of data-area elements assigned to directory entries in the castout class. The count is returned on a write-when-registered or write-and-register command when a change signal is processed for the castout class, and the count is returned on a read-castout-class-information command when the castout class lies in the specified range.

Castout-Class Queue (CCQ):

An ordered subset of the directory designating directory entries in the castout class. The queue is maintained in update order; the most recently updated directory entries are at the bottom of the queue. The least recently updated entries are at the top of the queue. A castout-class queue exists for each castout class in the cache.

The castout-class counts and the total changed counts may be periodically compared to threshold values in order to initiate castout processing. This may be done in one of two ways:

Event-driven castout: The counts returned on the write-when-registered and write-and-register command are compared after each write operation. This triggers castout processing for the specified castout class at the time the write command occurs and defined thresholds are exceeded. The comparison is part of the processing of the transaction.

Timer-driven castout: A set of counters is requested at timed intervals using the read-castout-class-information command. The comparison is part of a background program and is not part of any transaction processing. A balance between responsiveness to castout processing and transaction overhead in obtaining the counts must be maintained.

Cache-Structure Operands

The cache-structure operands related to movement of data between SES and DASD are summarized in the following:

Change Control (CHGC):

The change control is a one-bit value that selects which process is used for writing the data, The two possible values are: 0 write data unchanged; 1 write data changed.

Local-Cache Identifier (LCID):

A one-byte unsigned binary integer that identifies a local-cache.

Name (N):

A 16-byte value that identifies a data block in the storage hierarchy,

Name Mask (NM):

A two-byte value that determines the bytes used for name comparison.

Name-Replacement Control (NRC):

A one-bit value that controls the name-replacement process: 0 suppress replacement; 1 replace name, Replacement Name (RN):

A 16-byte value that identifies a data block being replaced in a local cache.

Restart Token (RT):

An eight-byte value that controls the processing of an operation against the directory that spans multiple commands.

Cache Structure Processes

Castout-Class Removal:

A castout-class-removal process is made for a specified directory entry. The processing is as follows:

The directory entry is removed from the castout-class queue specified in the directory entry.

The castout-class count for the castout class specified in the directory entry is decremented.

The total-changed count for the storage class containing the directory entry is decremented.

Change-Signal Processing:

A change signal is processed for a specified data area and castout class. The processing is as follows:

The change bit is set in the directory entry indicating the data is cached as changed.

When the change signal is the first change signal processed for the directory entry, the user-data field is stored in the directory entry. The first change signal occurs when the data is initially not cached or cached as unchanged. When the data is initially cached as changed, the change signal is a second or subsequent change signal, and the user-data field is not stored.

The castout class is stored in the directory entry, and the directory entry is queued at the bottom of the castout-class queue. This may be the initial placement in a castout class, may represent a change of class specification, or may be an update of the data within the castout class.

The castout-class count is updated. If this is the initial placement in a castout class, the castout-class count is increased by one. If this is a change of class, the castout-class count for the source class is decremented, and the castout-class count for the target castout class is increased by one. If this is an update within the castout class, the castout-class count is not updated.

The setting of the change bit in the directory entry must be done before the command is completed.

Name Assignment:

A name assignment is processed for the specified name by obtaining an invalid directory entry, marking it valid, initializing the name and attaching the directory entry to the directory.

When no invalid directory entries are available, a valid directory entry may be reclaimed by the SES, cleared of its current contents, and attached to the directory. The oldest unchanged directory entry is reclaimed.

Name Comparison:

The name comparison is a byte-level comparison and is controlled by the mask field. The 16 bits, left to right, in the mask field correspond one for one with the 16 bytes, left to right, of the name field. The comparison proceeds left to right, byte by byte. When the corresponding bit in the mask is one, the bytes are compared; otherwise, the comparison is not made and the operation continues with the next byte.

Writing the Data Changed:

When a data element is stored in a changed state, the castout-class count for the specified castout class and the total count of changed data elements in the SES are returned.

Cache-Structure Commands:

The following commands are described in reference to actions taken at the SES and against SES objects as shown in the process flow diagrams for:

Read Castout Class—FIG. 5

Figure 6:
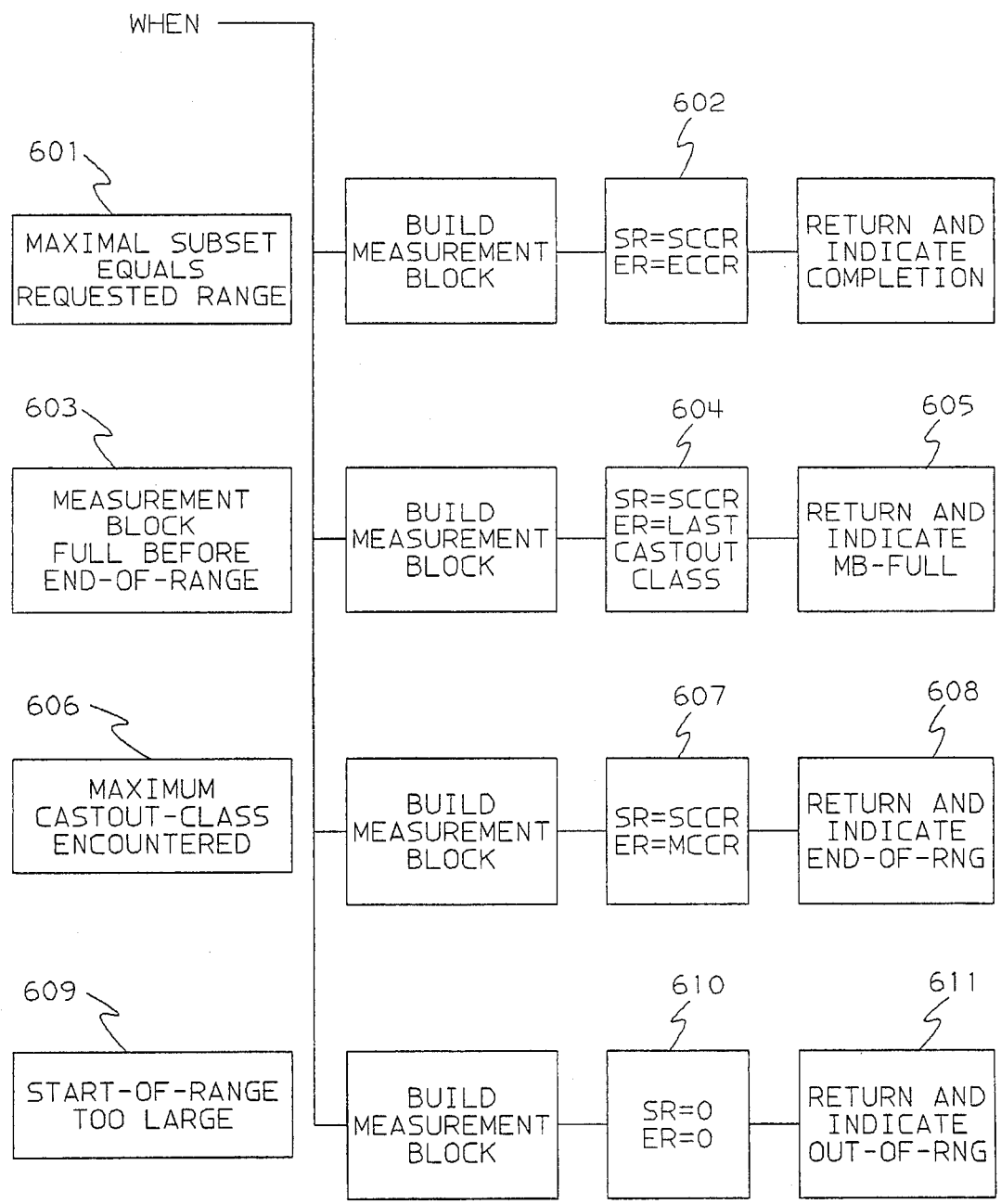
FIG. 6 provides a flow diagram that represents a read castout class information command.

Read Castout-Class Information—FIG. 6

Read Directory—FIG. 7

Read for Castout—FIG. 9

Unlock Castout Locks—FIG. 10

Figure 11:
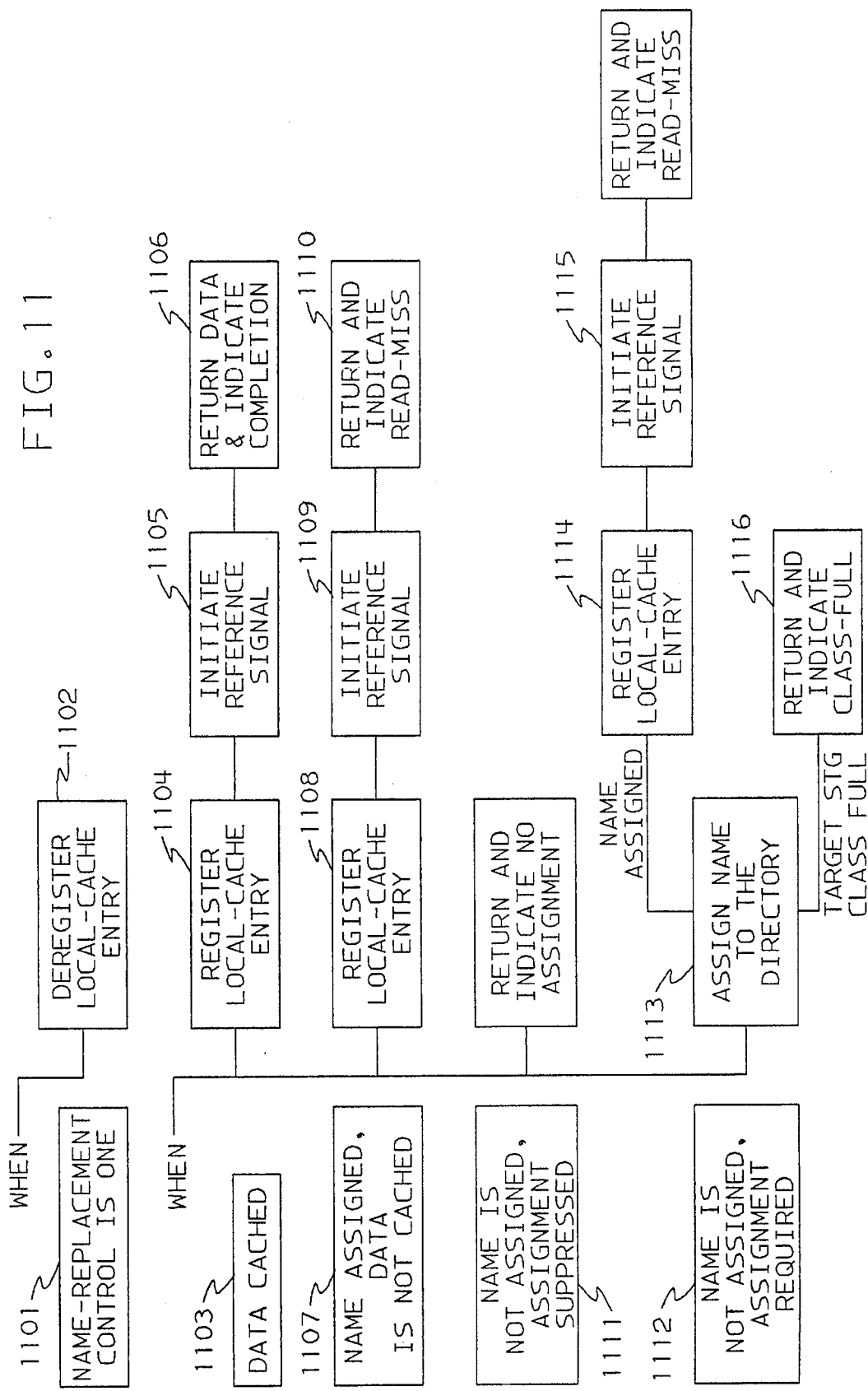
FIG. 11 provides flow diagrams that represent a read and register command.

Read and Register FIG. 11

Figure 12:
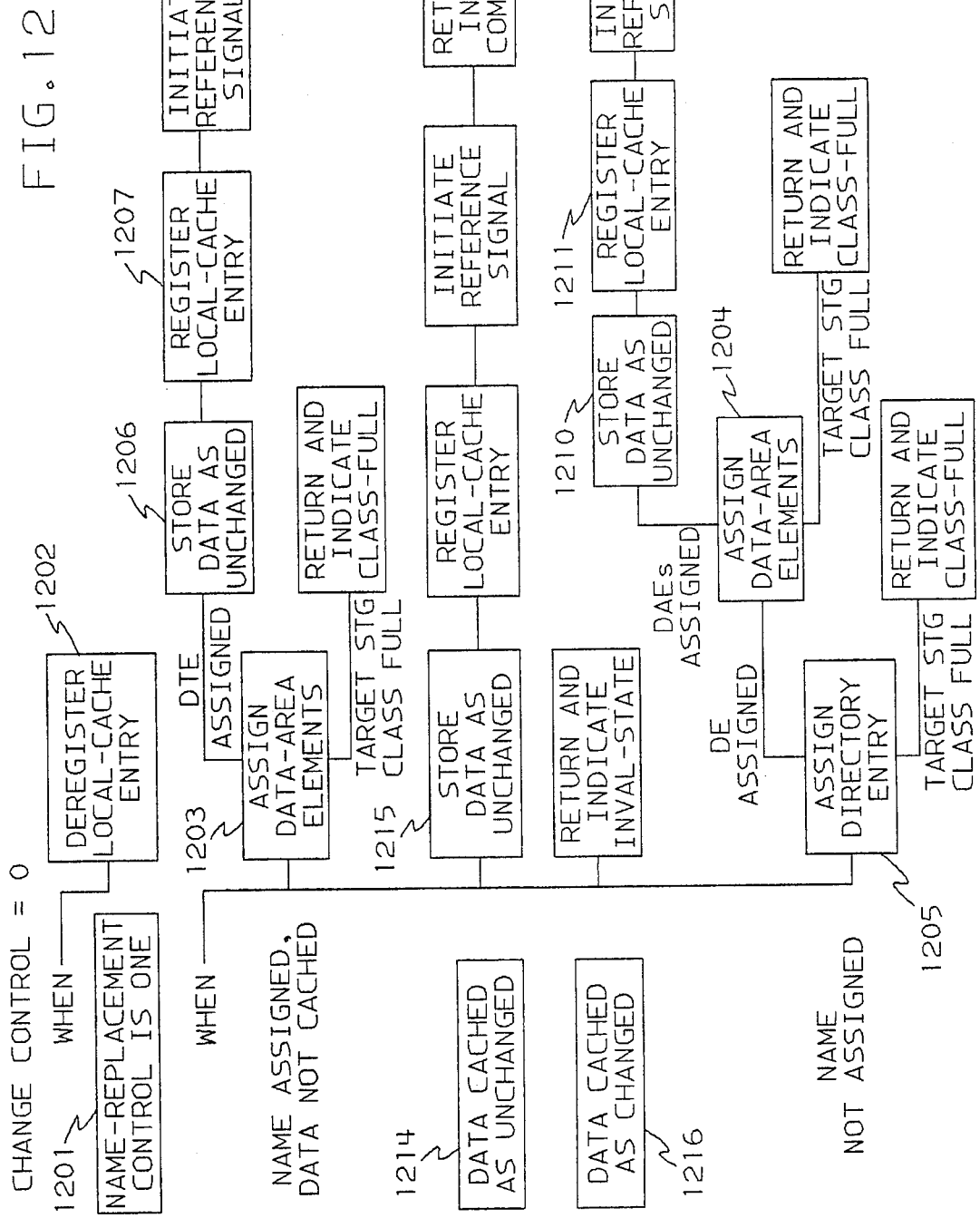
FIG. 12 provides flow diagrams that represent a write and register command when the SES change control indicates an unchanged record state.
Figure 13:
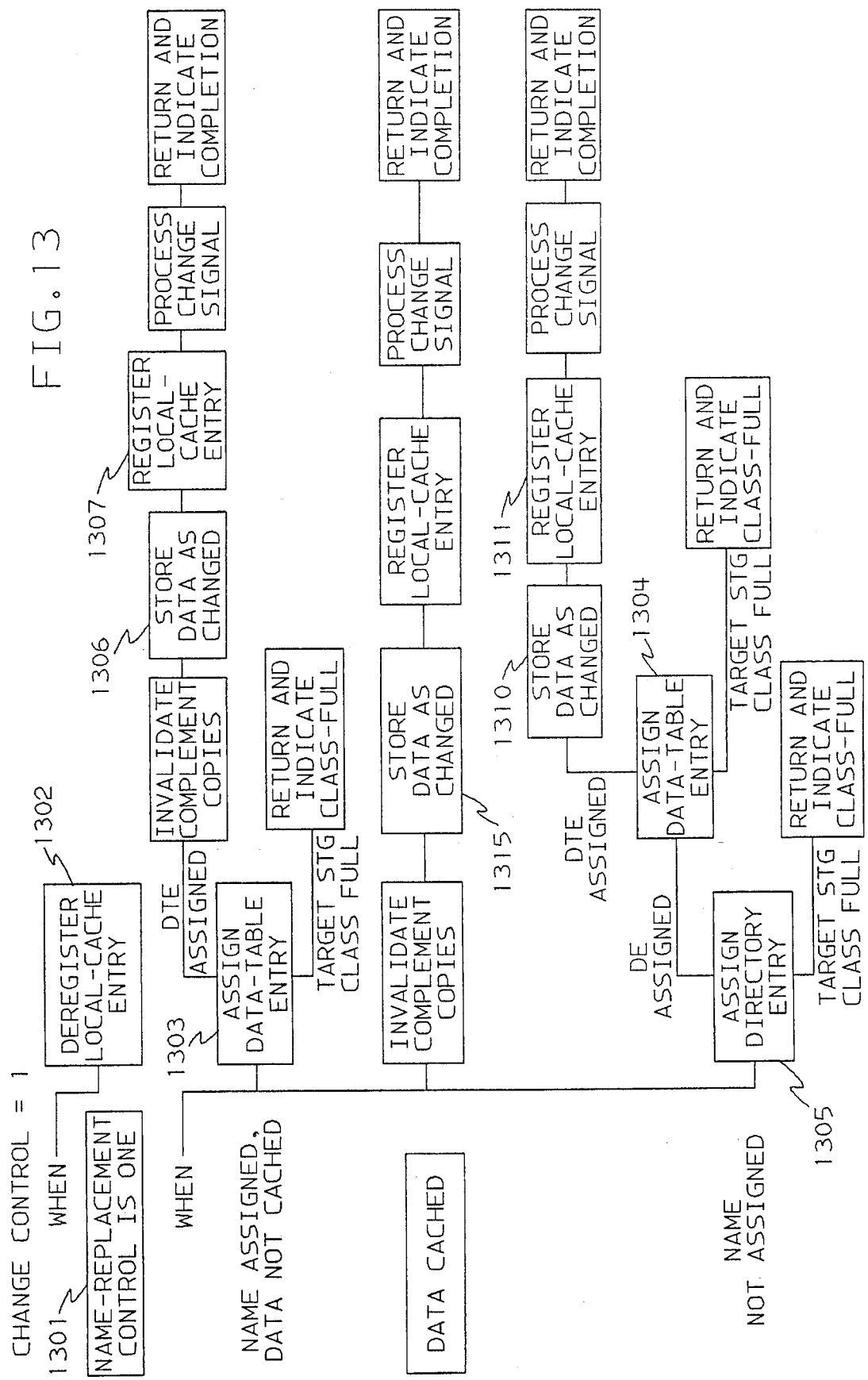
FIG. 13 provides flow diagrams that represent a write and register command when the SES change control indicates a changed record state.

Write and Register—FIGS. 12 and 13

Figure 14:
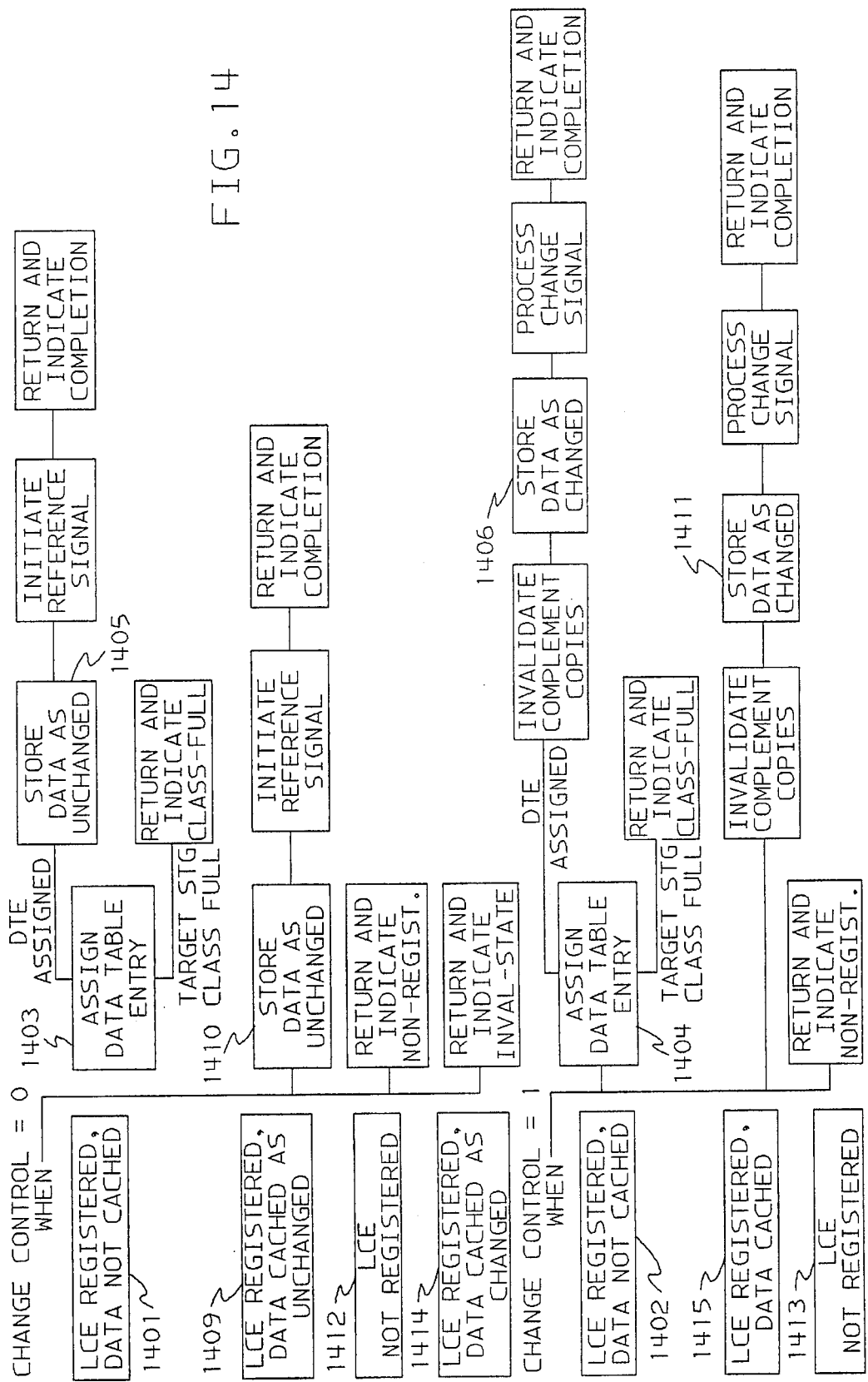
FIG. 14 provides flow diagrams that represent a write when register command.

Write When Registered—FIG. 14

Read Castout Class:

The processes invoked by the read-castout-class command are summarized in FIG. 5. The read-castout-class command returns a list of name blocks (NB) to main storage. Directory entries are processed when the name field matches the input name under the mask condition and the directory entry is queued to the specified castout-class queue.

The name comparison is successful when all the unmasked bytes are equal (501). A zero mask causes all names to be returned.

The castout class is scanned. A name block is added to the list to be returned, and the processed count is increased by one for each name in the castout class that matches the input name under the mask condition (502).

The castout-class scan is controlled by the restart-token request operand. A token value of zero starts the processing, and a nonzero token value restarts the processing from the place designated by the token. Processing is completed when the data block is full, when the entire castout class has been processed, or when a model-dependent timeout has been exceeded. When the data block is full (503), a restart token is generated (504) and returned along with the list of directory elements (505) and the processed count. When the end of the castout class is reached (506), the list of directory elements and the processed count are returned (507) to the program. When a model-dependent timeout occurs before the end of the table is reached (508), a restart token is generated (509) and returned along with the list of directory elements (510), and the processed count.

The castout-class scan starts at the directory entry designated by the restart token and proceeds in the order designated by the castout-class queue ordering. The ordering of the scan is required for each execution of the read-castout-class command but is not required across separate executions of the command. Movements on the queue between successive read-castout-class commands may alter the location of the initial point of the scan for the subsequent execution. This may cause some elements of the castout-class queue to be missed or to be returned multiple times. When a zero-valued restart token is provided, the scan starts at the top of the castout-class queue.

Several issuances of the read-castout-class command may be required to return the entire castout class. If a consistent and complete queue is needed by the program, the program must ensure that no write activity occurs to the castout class until the castout-class scan is completed.

Read Castout-Class Information:

The processes invoked by the read-castout-class-information command are summarized in FIG. 6. The read-castout-class-information command returns statistics for a range of castout classes. The counters for a maximal subset of the specified range of castout classes and the range of the maximal subset are placed in the data block. The counters are placed in the data block in sequential order by castout class. The first counter is the counter for the castout class specified as the start-of-range (SR). The last counter stored depends on the size of the requested range and the end-of-range (ER) value. When the end-of-range value is less than the maximum-castout-class value and the entire range fits in the data block, the maximal subset is equal to the entire range (601). In this case the requested start-of-range and end-of-range values are placed in the SR and ER data operands, respectively (602).

When the data block is full and the castout-class value of the last counter stored is smaller than the maximum-castout-class value (603), the start-of-range and last-castout-class values are placed in the SR and ER data operands, respectively (604) and a response code indicating additional entries exist is returned (605).

When the specified end-of-range value is larger than the maximum-castout-class value and the data block is not full (606), the start-of-range and maximum-castout-class values are placed in the SR and ER data operands, respectively (607), and an out of range response code is returned (608).

When the requested start-of-range is larger than the maximum-castout-class value (609), the value zero is stored in the SR and ER operands (610), and an error response is returned (611).

Read Directory:

The processes invoked by the read-directory-under-mask command are summarized FIG. 7. The read-directory command scans the directory and returns a list of directory-entry-information blocks or returns a list of name blocks. Directory entries are processed when the name field matches the input name under the mask condition and the changed state matches the requested state. Directory entries are processed when the name field matches the input name under the mask condition and the changed state matches the requested state (701). The name comparison is successful when all the unmasked bytes are equal (702). A zero mask causes all names to be processed.

When the change-state-selection control is zero, all directory entries which match the name under the mask condition are processed. When the change-state-selection control is one, only entries which are changed or locked for castout and match the name under the mask condition are processed.

The directory is scanned. A directory-entry information block is added to the list of directory blocks to be returned (NB) (703 and 704) and the processed count (PC) is increased by one when the request is for changed data, and the name in the directory entry matches the input name under the mask condition, and the changed state of the data matches the change-state-selection criteria.

The directory scan is controlled by the restart-token request operand. A token value of zero starts the processing, and a nonzero token value restarts the processing from the place designated by the token. Processing is completed when the data block is full, when the entire directory has been processed, or when a model-dependent timeout has been exceeded. When the data block is full (705), a restart token is generated (706) and returned along with the list of directory blocks to be returned (707), and the processed count. When the end of the directory is reached (708), the list of directory blocks to be returned (709), and the processed count are returned to the program. When a model-dependent timeout occurs before the end of the directory is reached (710), a restart token is generated and returned (711) along with the list of directory blocks to be returned (712), and the processed count.

The format of the directory-entry information block (DEIB) is shown in FIG. 8.

Scanning a directory may require multiple executions of the read-directory command. The directory may change during the scanning process. The set of directory entries that must be processed before the scanning is complete consists of the valid directory entries that exist at the initiation of directory-scan processing and remain valid. Directory entries that are added or deleted after the scanning is initiated do not need to be processed. A directory entry need only be processed once. Any directory entries updated after they are processed do not need to be processed a second time.

Read For Castout:

The processes invoked by the read-for-castout command are summarized in FIG. 9. The read-for-castout command returns the contents of a named data area to the local cache and locks the name for castout.

When the data is cached and changed but not locked for castout (901), the data is marked as locked-for-castout by storing the value of the LCID operand in the first byte of the castout lock, by storing the value of the CPID operand in the second byte of the castout lock, and by resetting the change bit to zero (902). The data response code indicating completion are returned (903). The data is returned to the main-storage location specified by the data address in the message-command block and, the adjunct data, when present, and is returned in the message-response block. The storage class is incremented.

When the data is locked for castout (904), the value of the castout-in-progress lock is returned (905).

When the data is not cached, or cached but not changed (906), the command is completed with an exception response code (907).

When the name is not assigned to the directory (908) an error response code is returned.

Unlock Castout Locks:

The processes invoked by the unlock-castout-locks-list command are summarized in FIG. 10. The unlock-castout-locks command resets the castout lock to zero and stores the user-data field in the directory entry for a list of names.

Each list item, starting with the item designated by the SL request operand, is processed. Processing continues until either the end of the list is reached, an error occurs in the processing of a list item, or a model-dependent timeout is exceeded. Processing for each list item is as follows:

The directory entry containing the name is located. When the data is locked for castout and the value of the castout lock matches the value of the local-cache identifier, the castout lock is set to zero (1001), and the user-data field is stored in the directory entry (1002). If the change bit and the change-bit over-indication (CBO) are both zeros, the directory entry is removed from the castout-class queue (1003). If the change bit is zero and if the change-bit over-indication is one, the change bit is set to one (1004). Processing is complete for the list item. The next list item is processed. If the end of the list is reached (1005), the command is completed, and completion response code is returned (1006).

When the name is assigned to the directory and the castout lock does not match the value of the local-cache identifier (1007), the list item is not processed. The value of the list item is placed in the current-list-item response operand (1008), the value of the castout lock is placed in the castout-lock-value response operand (1009). No further processing occurs, and the response is returned.

When a model-dependent timeout is exceeded (1010), the value of the last list item successfully processed is placed in the current-list-item response operand (1011), and response code indicating the time out is returned (1012).

When the name is not assigned to the directory (1013), the list item is not processed. The value of the list item is placed in the current-list-item response operand (1014). No further processing occurs, and the response is returned (1015).

When a nonzero response code is returned, the list has not been entirely processed. The CLI response operand identifies the point at which processing was completed. All list items before the designated list item have been processed, and all those after the designated list item have not been processed.

When an exception response code is returned, an error occurred during processing of the list item. The program may continue list processing by reissuing the command with the value of the start-of-list operand (SL) set to one greater than the value of the current list item (CLI).

Read and Register:

FIG. 11 is a process flow diagram of the Read and Register command. The read-and-register command returns the contents of a named data area to the local cache and registers the local-cache entry. When the data is not cached, only the registration operation is performed. The read-and-register command also assigns the name to the directory when the name is not currently assigned.

When the name-replacement-control request operand (NRC) is one (1101), the local-cache entry designated by the replacement-name and local-cache-identifier request operands is deregistered (1102). When the name-replacement control is zero, no deregistration is performed.

When the data is cached (1103), the local-cache entry is registered (1104), a reference signal is initiated for the storage class (1105), and the data along with the change bit is returned (1106).

When the name is assigned to the directory but the data is not cached (1107), the local-cache entry is registered (1108) and a reference signal is initiated for the storage class (1109).

When the name is not assigned to the directory and directory assignment is not suppressed (1112), a directory-entry-assignment operation is performed (1113). If the cache is not full, a directory entry is assigned, the local-cache entry is registered (1114), and a reference signal is initiated for the storage class (1115).

When the name is not listed in the directory and assignment is suppressed (1111), the command is completed and an exception response code is returned.

Write and Register:

FIGS. 12 and 13 are process flow diagrams of the Write and Register command. The write-and-register command stores the contents of the data block in the data area and registers the local-cache entry when the change control is compatible with the change state of the data.

The write-and-register command also assigns a directory entry whenever the name is not currently assigned to the directory.

When the name-replacement-control request operand (NRC) is one (1201 and 1301), the local-cache entry designated by the replacement-name and local-cache-identifier request operands is deregistered (1302 and 1302). When the name-replacement control is zero, no deregistration is performed.

When the data is not cached, a data-table entry is assigned (1203, 1204, 1303, and 1304). The name may or may not be assigned to the directory. If not, then a name assignment is also made (1205 and 1305). If the assignments are successful, the data is written to the SES cache unchanged when the change control is zero (1206 and 1210) and is written changed when the change control is one (1306 and 1310), and the local-cache entry is registered (1207, 1211, 1307, 1311).

When the data is already cached as unchanged (1214), the data is written unchanged if the the change control is zero (1215), and the data is written changed if the change control is one (1315).

When the data is already cached as changed and the change control is zero (1216), the data is not written, and the local-cache entry is not registered. The change control is incompatible with the change state of the data. The command is completed and an exception response code is returned.

When the data is cached as changed and the change control is one (1315), the data is written changed and a successful response code is returned.

Write When Registered:

FIG. 14 is a process flow diagram of the Write When Registered command. The write-when-registered command stores the contents of the data block in the data area, provided the name is assigned in the directory, the local-cache entry is registered, and the change control is compatible with the change state of the data.

When the local-cache entry is registered and the data is not cached (1401 and 1402), a data-table entry is assigned (1403 and 1404). If the assignment is successful and the change control is zero (1405), the data is written unchanged. If the assignment is successful and the change control is one (1406), the data is written changed.

When the local-cache entry is registered and the data is already cached as unchanged (1409), the data is written unchanged when the change control is zero (1410), and the data is written changed when the change control is one (1411).

When the local-cache entry is not registered (1412 and 1413), the command is completed and an exception response code is returned.

When the local-cache entry is registered, the data is already cached as changed, and the change control is zero (1414), the data is not written. The change control is incompatible with the change state of the data.

When the local-cache entry is registered, the data is cached as changed, and the change control is one (1415), the data is written changed (1411).

Management of Data Movement Between DASD and SES Cache Usage

Figure 15:
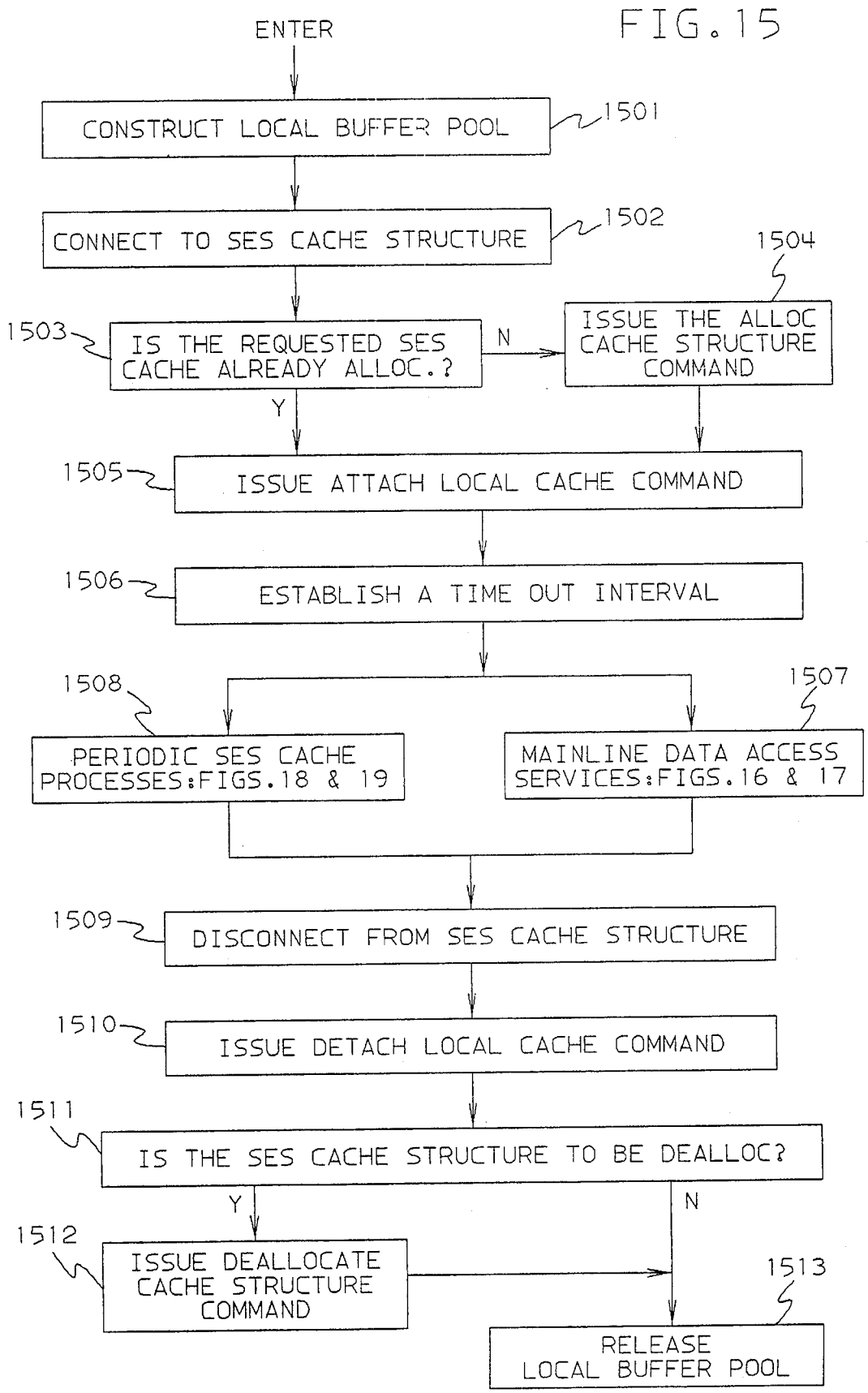
FIG. 15 is an overview of the flow for the buffer manager of a data base manager and associated use of a SES cache.

Overview:

An overview of the system structure comprised of a SES cache, local data managers utilizing a SES cache, and operating system support is given in FIGS. 15, 16, 17, 18, and 19. In FIG. 15, processing performed by the buffer manager of the data base manager is summarized. When a data base to be shared among systems in a sysplex is initially accessed, a local buffer pool may be constructed (1501), operating system services which provide support for the SES cache structure may be invoked to authorize the buffer manager to access the SES cache structure (1502), and a time out interval may be set using operating system services (1506).

Operating system services which support a SES cache structure are invoked (1502) to authorize the buffer manager to access the SES cache structure. These services first determine if the SES cache structure requested has already been allocated (1503). If the SES structure has not already been allocated, the Allocate Cache Structure command is invoked to cause the SES cache structure to be created (1504). The operating system service selects a local cache identifier (LCID) and causes the cache coherency bit vector to be created by issuing the DEFINE VECTOR CPU instruction. The Attach Local Cache command is issued to associate the local cache with the SES cache (1505).

Figure 16:
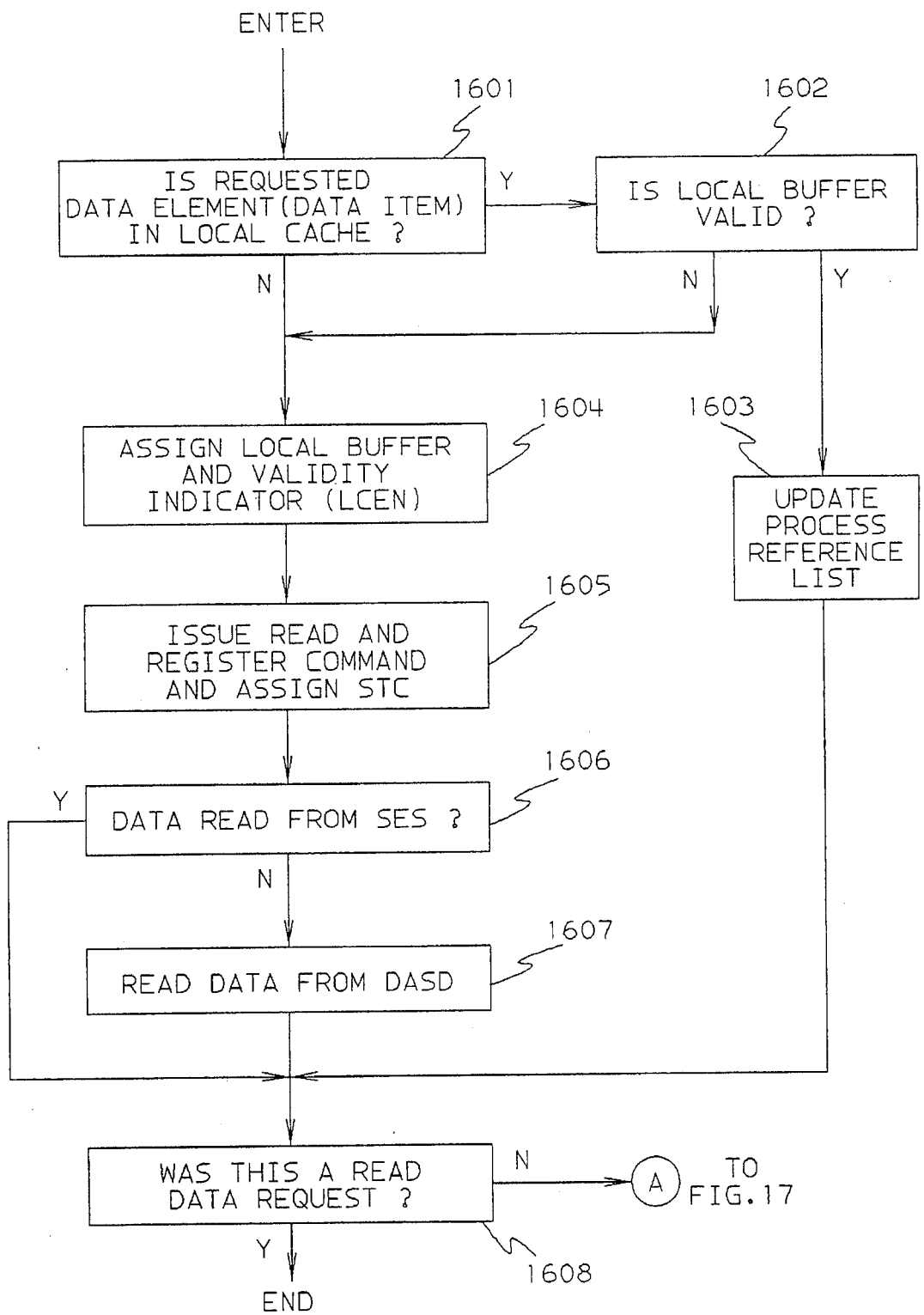
FIG. 16 is a flow diagram of buffer manager processing for a read operation.
Figure 17:
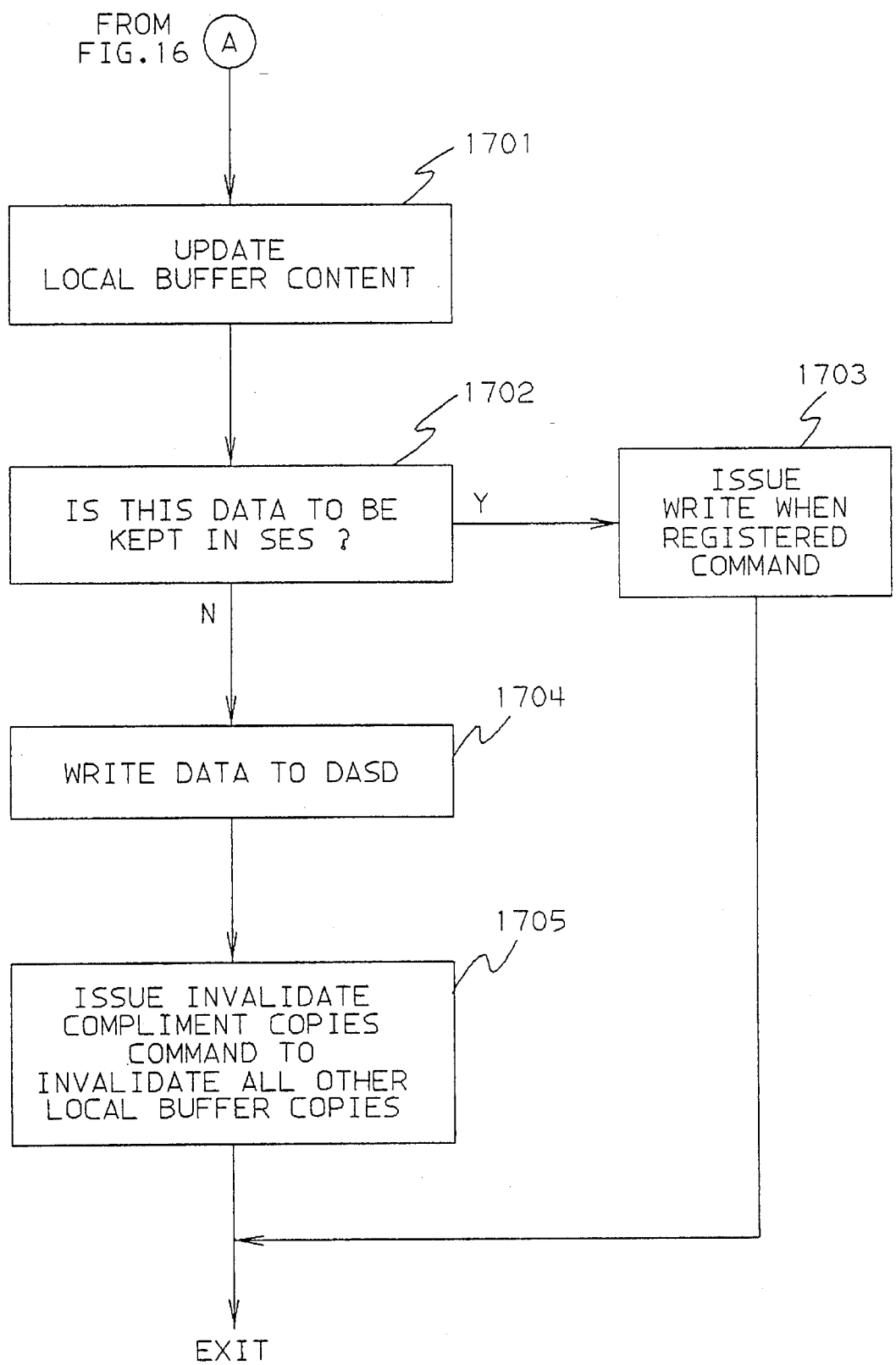
FIG. 17 is a flow diagram of buffer manager processing for a write operation.

During mainline operation, access to the data base is supported by the buffer manager. Many different protocols may be followed. An example of mainline usage is shown in FIGS. 16 and 17 (detail of 1507).

Data may be retrieved from DASD

Stored in the SES cache

Retrieved from the SES cache

Stored to DASD

Access to data is dictated by programs which execute on the CPC and make requests of the data base manager. For example, such programs may execute as the result of requests from end users which cause transaction programs to be executed.

When a request is made of the data base buffer manager, the buffer manager determines if the requested data is already in a local buffer (1601). If the data is in a local buffer, the validity of the data is checked (1602). Data in a local buffer may become invalid due to updates performed by other instances of the data base manager (FIG. 17 at 1703 and 1705). If the data is valid in the local buffer, an entry is made in the name list used to update the SES data element references via the process reference list command (1603).

If the data is not currently valid in the a local buffer, a buffer is assigned and a validity indicator is assigned (1604). The read and register command is issued to register the local buffer with the SES cache and to retrieve the data if the data is stored in the SES cache (1605). If the data is not retrieved from the SES cache (test made at 1606), the data is read from DASD (1608). A read request completes by returning the requested data to the caller.

For an update request, the buffer manager causes the local buffer content to be updated (1701). A determination is then made as to whether or not the data is to be stored in the SES cache (1702). If the data is to be stored in the SES cache, the write when registered command is issued (1703). As part of the processing performed by the write when registered command, all other copies of the data element in local buffers of other instances of the data base manager are made invalid. If the data is not to be stored in the SES cache, the data may be written to DASD (1704). When the data has been written to DASD, the invalidate compliment copies command is issued to cause all other copies of the data element in local buffers of other instances of the data base manager to be made invalid (1705).

Figure 18:
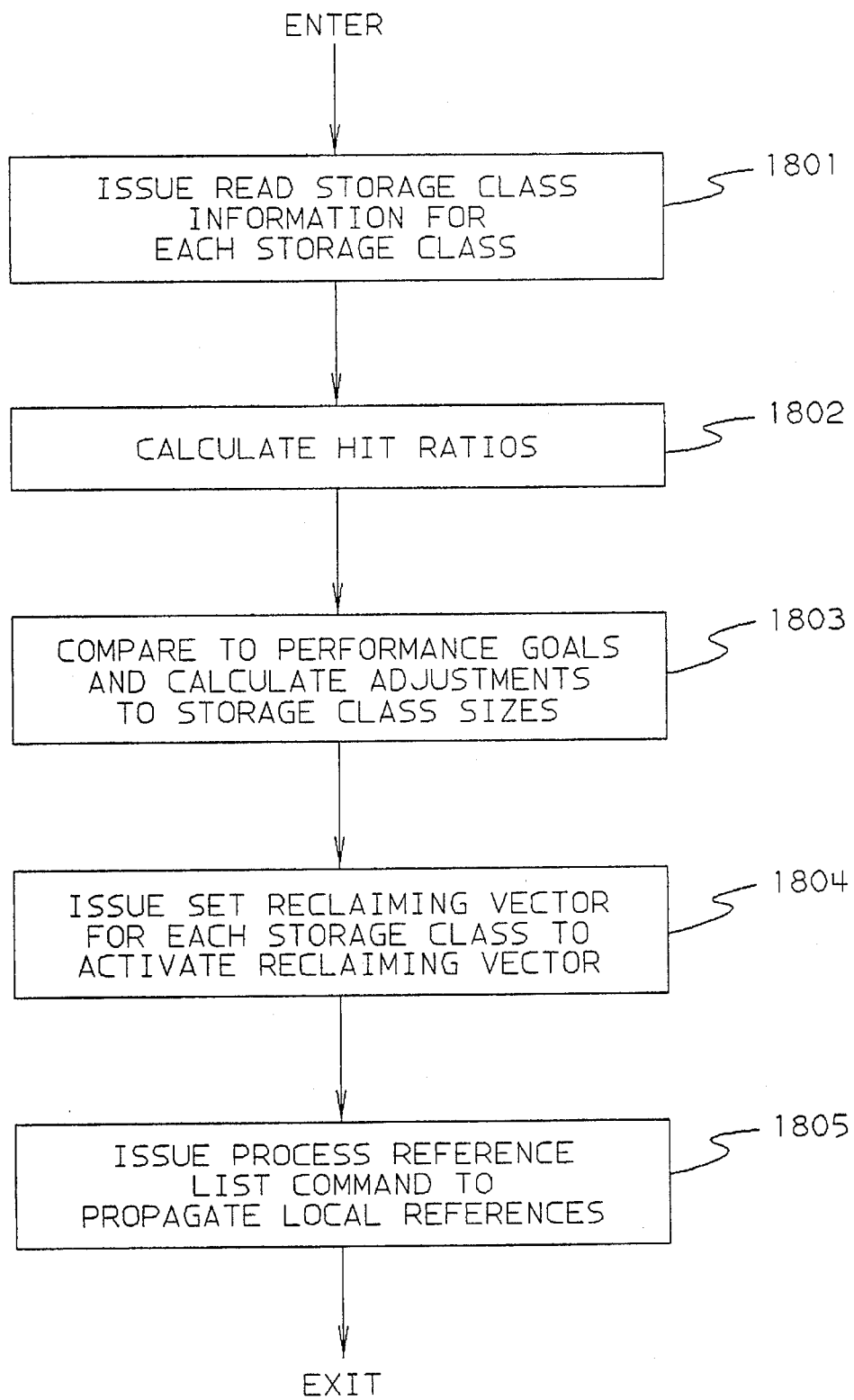
FIG. 18 is a flow diagram of SES cache storage management for a buffer manager.
Figure 19:
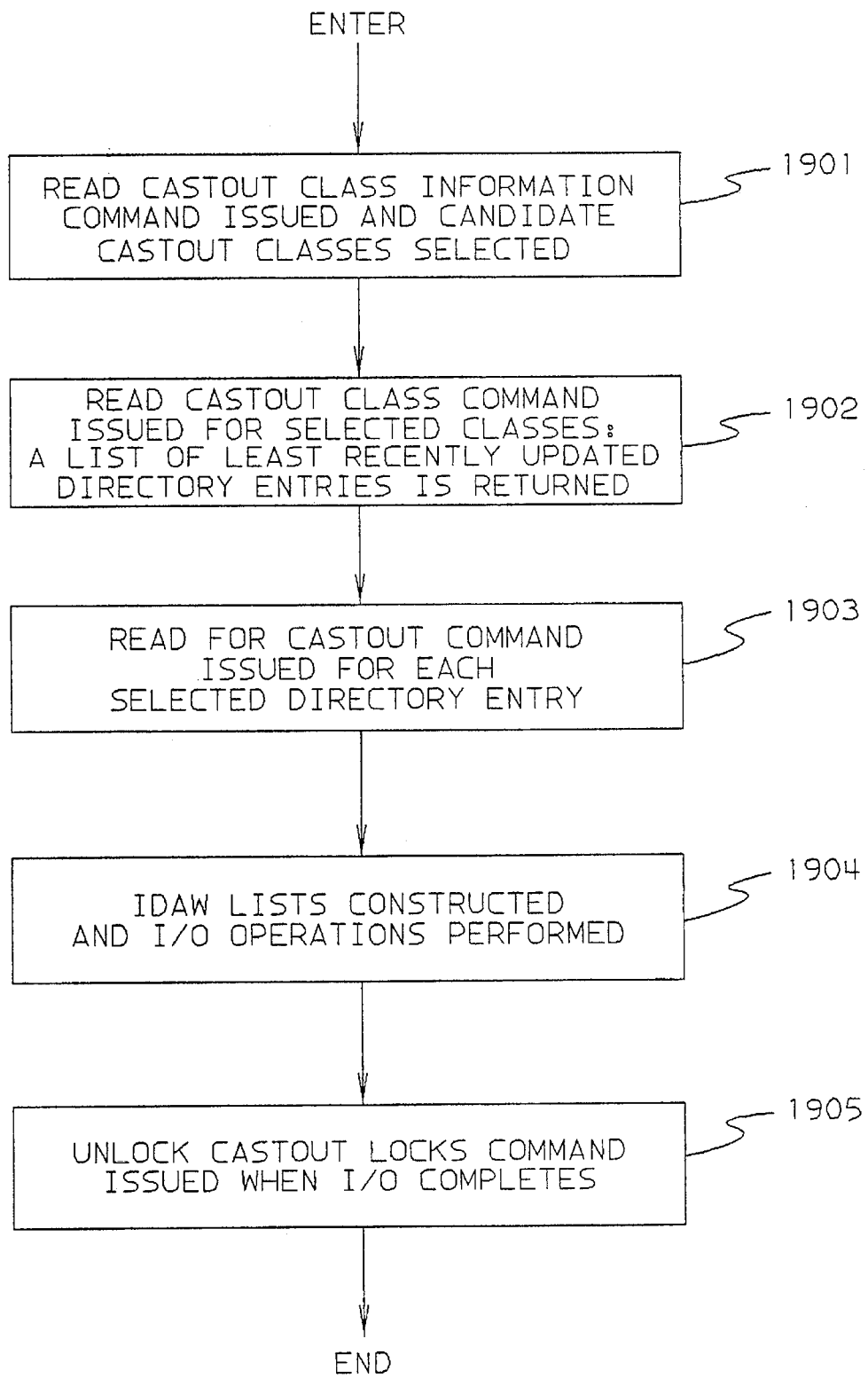
FIG. 19 is a flow diagram of migration of SES cache data to DASD by a buffer manager.

During mainline operation, the buffer manager is also responsible for managing the storage of the SES cache (1508 and detailed in FIGS. 18 and 19). The buffer manager is also responsible for managing the migration of changed data elements from the SES cache to DASD. The time out interval established during initialization causes the operating system to give control to processing routines on a periodic basis for management of SES cache storage and migration of SES cache data to DASD.

An overview of one protocol for managing the storage of a SES cache is shown in FIG. 18. This processing is given control on a periodic interval established by the data base manager during initialization of use of the SES cache structure. The read storage class information command is issued for each storage class (1801). Hit ratios for each storage class are calculated (1802). The achieved hit ratios are compared to the performance goals set for each storage class and adjustments to storage class sizes are calculated (1803). For each storage class in which a change of allocated SES resources is required, the set reclaiming vector command is issued to activate the reclaiming vector (1804). The process reference list command is issued (1805) for each storage class in which local buffer references have been recorded during mainline operation (1603).

An overview of one protocol for managing the movement of data from the SES cache to DASD is shown in FIG. 19. This processing is given control on a periodic interval established by the data base manager during initialization of use of the SES cache structure. The read castout class information command is issued for each cast out class and candidate castout classes are selected (1901). The read castout class command is issued for each selected castout class (1902). A list of least recently updated directory entries is returned. The read for castout command is issued for each selected directory entry (1903). I/O requests are built to cause the data read from SES to be written to DASD (1904). When the I/O operations have completed, the unlock castout locks command is issued (1905).

When all data bases using a SES cache are no longer being accessed, the data base manager may disconnect from the SES cache (1509). The data base manager may choose to migrate all modified data elements from the SES cache to DASD or leave the modified data elements in the SES cache. If there are no remaining modified data elements in the SES cache, the SES cache structure may be deallocated or remain allocated for future use. The data base manager invokes operating system services to disconnect from the SES cache structure (1509). The Detach Local Cache command is issued to disassociate the local cache from the SES cache. If required, the operating system makes the local cache identifier (LCID) available for reassignment. The DEFINE VECTOR CPU instruction is issued to free the cache coherency vector. The operating system services determine if the SES cache structure is to be deallocated (1511). If the SES cache structure is to be deallocated, the Deallocate Cache Structure command is invoked (1512). The local buffer pool is then released by the data base manager (1513).

Assignment of Castout Class:

A castout class is assigned to a data element through the Write When Registered and Write and Register commands when the data is stored as changed. As part of change-signal processing:

The castout class is stored in the directory entry, and the directory entry is queued at the bottom of the castout-class queue. This may be the initial placement in a castout class, may represent a change of class specification, or may be an update of the data within the castout class.

The castout-class count is updated. If this is the initial placement in a castout class, the castout-class count is increased by one. If this is a change of class, the castout-class count for the source class is decremented, and the castout-class for the target castout class is increased by one. If this is an update within the castout class, the castout-class count is not updated.

When the change signal is the first change signal processed for the directory entry, the user-data field is stored in the directory entry. The first change signal occurs when the data is initially not cached or cached as unchanged. When the data is initially cached as changed, the change signal is a second or subsequent change signal, and the user-data field is not stored.

Assignment of a castout class is based on the DASD volume on which the data element permanently resides. The data manager which is using a SES cache associates a castout class with each DASD volume.

Castout Processing:

The castout-class counts and the total changed counts may be periodically compared to threshold values in order to initiate castout processing. This may be done in one of two ways:

Event-driven castout: The counts returned on the write-when-registered and write-and-register command are compared after each write operation. This triggers castout processing for the specified castout class at the time the write command occurs and defined thresholds are exceeded. The comparison is part of the processing of the transaction.

Timer-driven castout: A set of counters is requested at timed intervals using the read-castout-class-information command. The comparison is part of a background program and is not part of any transaction processing. A balance between responsiveness to castout processing and transaction overhead in obtaining the counts must be maintained.

The castout process may determine the count of data elements for a range of castout classes using the Read Castout Class Information command. Based on the returned counts and the management protocol being followed, programming may initiated castout processing for DASD volume(s). For each DASD volume on which changed data elements are to be written, programming issues the Read Castout Class command. Selection of data elements matching a particular name mask provides programming the ability to select only those data elements associated with a particular data set. The data element name and user data field associated with the selected castout class and name mask are contained in the name block returned by the Read Castout Class command. Programming may select data elements from the returned data and initiate movement of the data from the SES cache to DASD.

The castout process retrieves a data element from the SES cache using the Read for Castout command. The Read for Castout command sets the castout lock in order to insure a single process is writing the changed data to DASD. The change bill is reset when the castout lock is set. Insuring a single process is writing the changed data to DASD prevents race conditions which could cause modifications to the data to be lost. For example:

Process 1 retrieves a data element for writing to DASD.

Subsequently the data element is modified in the SES cache.

Process 2 retrieves the data element for writing to DASD.

Process 2 completes writing the data element to DASD.

Process 1 completes writing the data element to DASD.

Write operations to a data element with the castout lock set in SES complete. These write operations may turn on the change bit.

The Unlock Castout Locks command is issued when the data element has been successfully recorded on DASD. The Unlock Castout Locks command resets the castout lock. If the change bit has been set by a write operation, it remains set at the end of the Unlock Castout Locks command. If the process which is performing the castout fails, the Unlock Castout Locks command can force the change bit to be set. Forcing the change bit to be set enables programming to protect the changed nature of a data element when it is not known if the data element was successfully written to DASD.

The list form of the Unlock Castout Locks command provides programming an efficient means of completing the castout process when multiple data elements have been written to DASD. This is the complimentary processing to having a castout class queue which enables programming to effectively retrieve changed data elements for a single DASD volume and build efficient channel programs to transfer the changed data to DASD.

Managing to Changed Percentage:

General castout processing by a data manager may manage the SES cache so as to have no more than approximately 20% of the data changed. The program observes the portion of changed data in the SES cache and initiates castout processing to moved changed data elements to DASD. Selection of which data elements to move to DASD to maintain a less than 20% changed condition is the decision of the program. For efficiency purposes, it is best to select a castout class with sufficient data elements to cause channel programs which transfer multiple physical blocks to be written.

Managing to Oldest Changed Data:

When data is written to SES with the change control indicating changed data, change signal processing is initiated. When the change signal is the first change signal processed for the directory entry, the user-data field is stored in the directory entry. The user-date field is used by the program to contain a time value which represents the oldest point in time when the data element was changed and that change has not yet been migrated to DASD. Of all the data elements in the SES cache used by the program, the data element with the oldest time value represents the point in time longest ago for which the program would have to process log data in order to recover the data bases in the event of a SES cache failure. The longer the time period over which log data would require processing to recover from a SES cache failure, the longer the recovery would take. Therefore, in addition to managing the amount of changed data in a SES cache, the program will have an advantage is the oldest changed data is migrated to DASD. Recognition of the the oldest changed data in a SES cache can be achieved through processing of the name block returned by the Read Directory and Read Castout Class commands.

Managing to DASD Volumes:

Regardless of the percentage of changed data elements or age of the oldest changed data element in a SES cache, programming will select to migrate data elements associated with a particular volume of data set to DASD on occurrence of specific events. For example, a program will migrate all changed data elements associated with a data base to DASD when the last user stops accessing a data base. The program will migrate all changed data elements associated with a data set or volume when a backup of the data set or volume is to be performed.

Scenarios for Management of Data Movement between DASD and SES Cache:

The facilities described above provide the base on which management of data movement between DASD and a SES cache is performed by system software. Techniques which use these primitive services to implement a non-blocking serialization protocol between write and castout of data from SES are described in the following. Techniques which use these primitive services to implement a non-blocking serialization protocol for caching a data element in SES are described in patent application Ser. No. 07/860,805 pending. In addition to these two protocols, the primitive services described provide the base for determining the set of modified data elements to be moved from a SES to DASD in a manner which optimizes the overall performance of the coupled systems environment.

Non-Blocking Serialization For Castout:

In the following usage scenarios, assume data elements being referenced in the storage hierarchy are pages. Then, a page cached in the shared cache (FIG. 1 at 111) is identified by a software-assigned name. Therefore, any requests for reading or writing in the shared cache are required to specify the name of the page which is the object of a request. There is no requirement for correct execution of this protocol that the data elements are pages.

Figure 20:
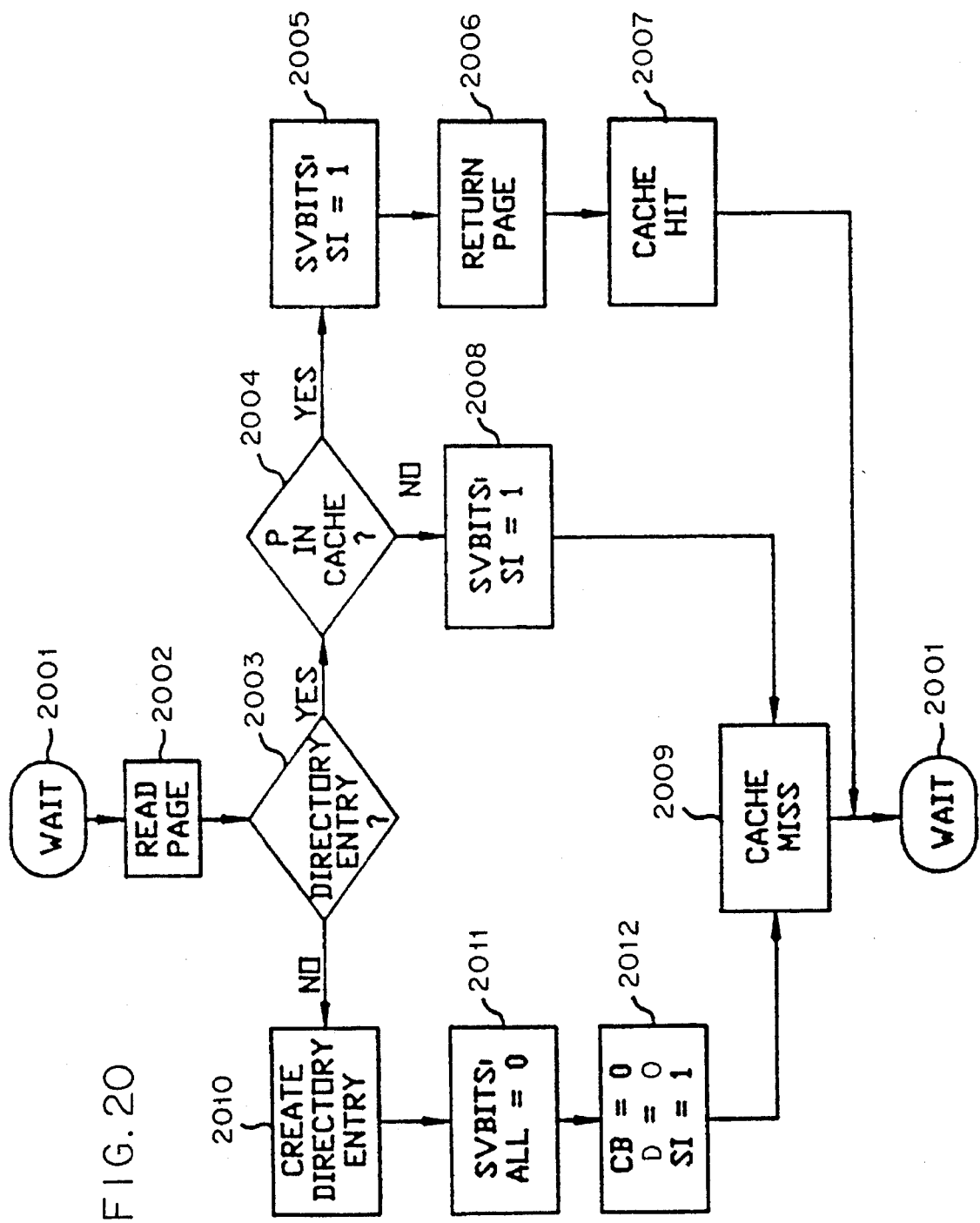
FIG. 20 is a flow diagram representing process flow for a READ command in support of non-blocking castout protocol.
Figure 21:
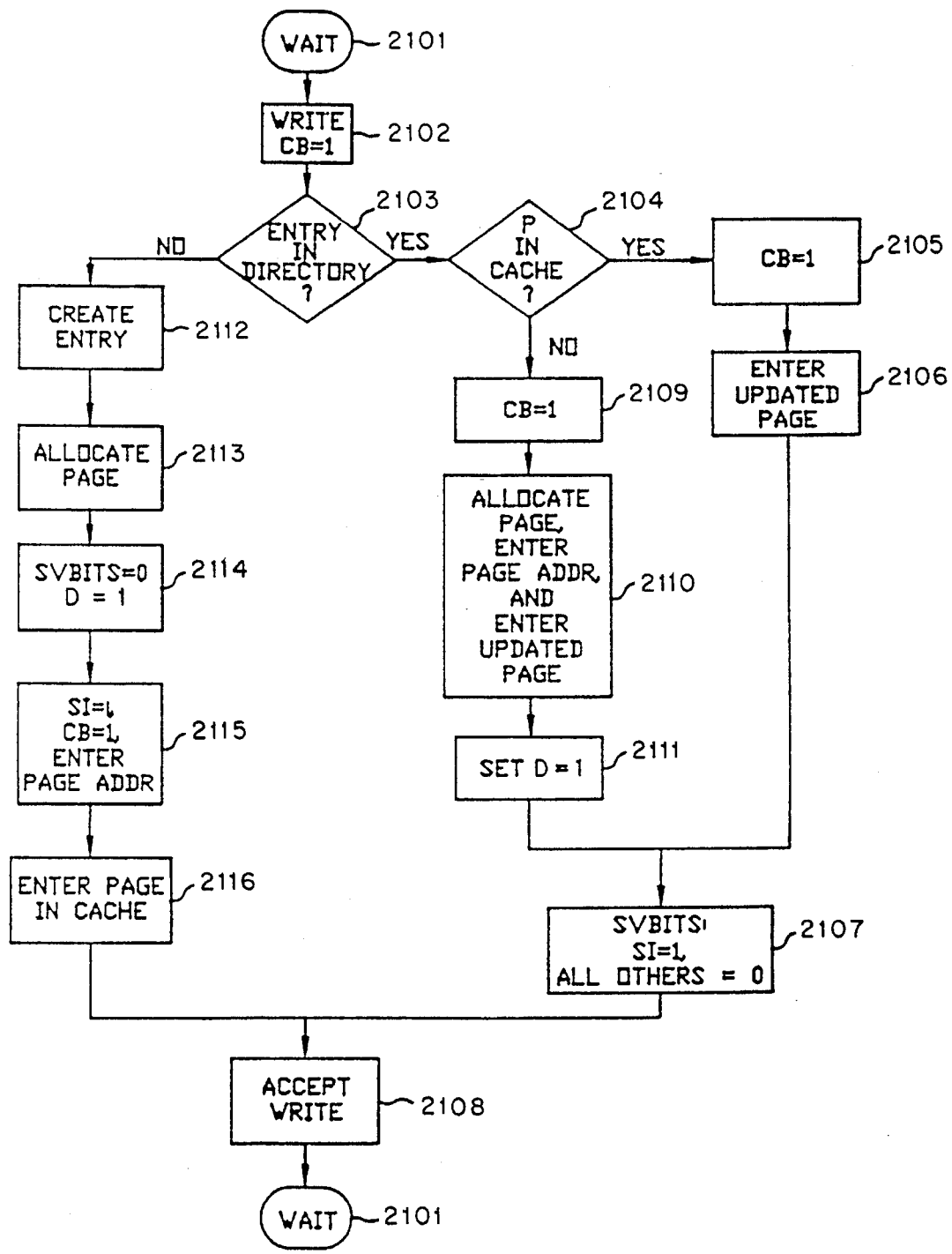
FIG. 21 is a flow diagram representing process flow for an unconditional WRITE command in support of non-blocking castout protocol.
Figure 22:
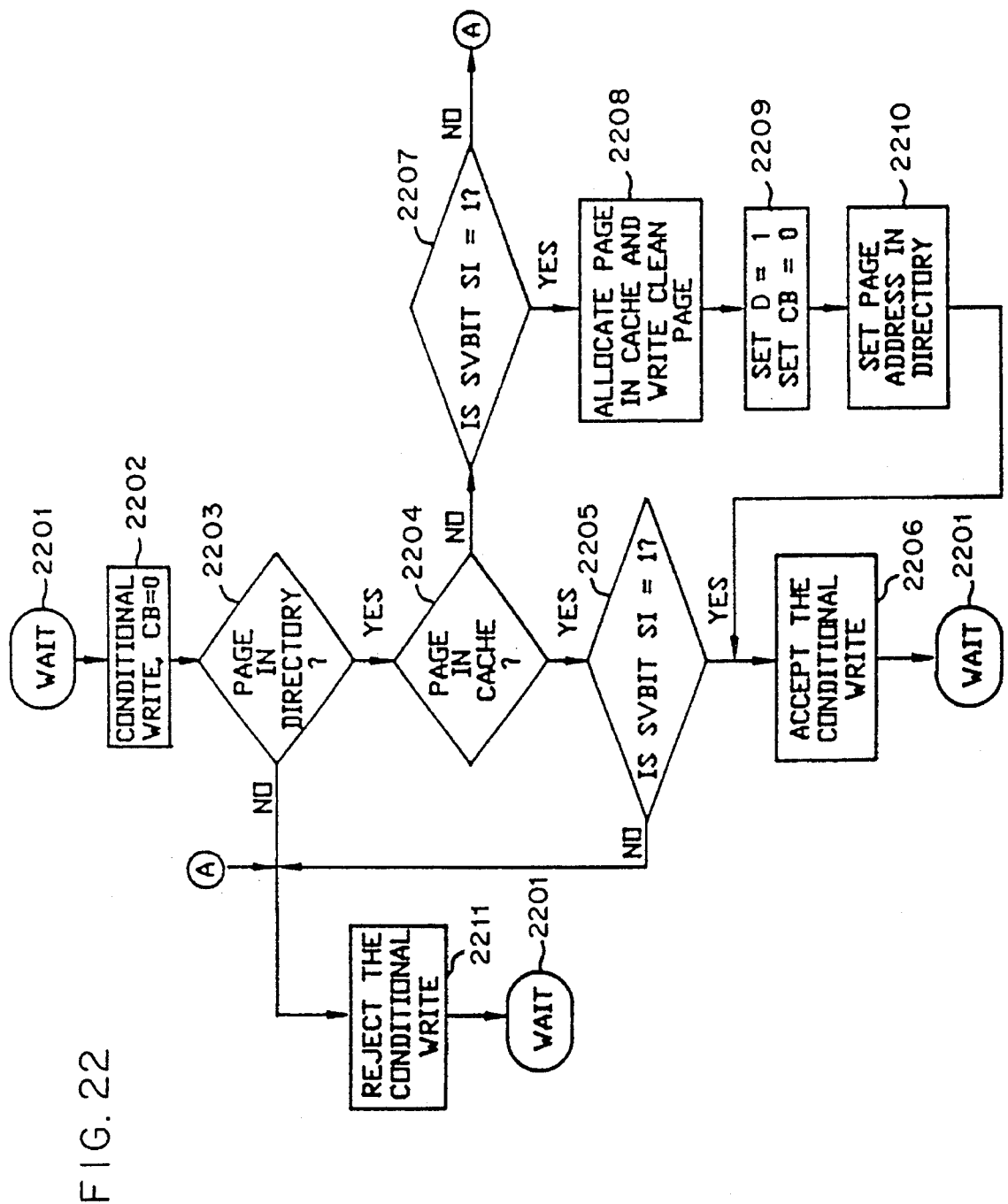
FIG. 22 is a flow diagram representing process flow for a CONDITIONAL WRITE command in support of non-blocking castout protocol.
Figure 23:
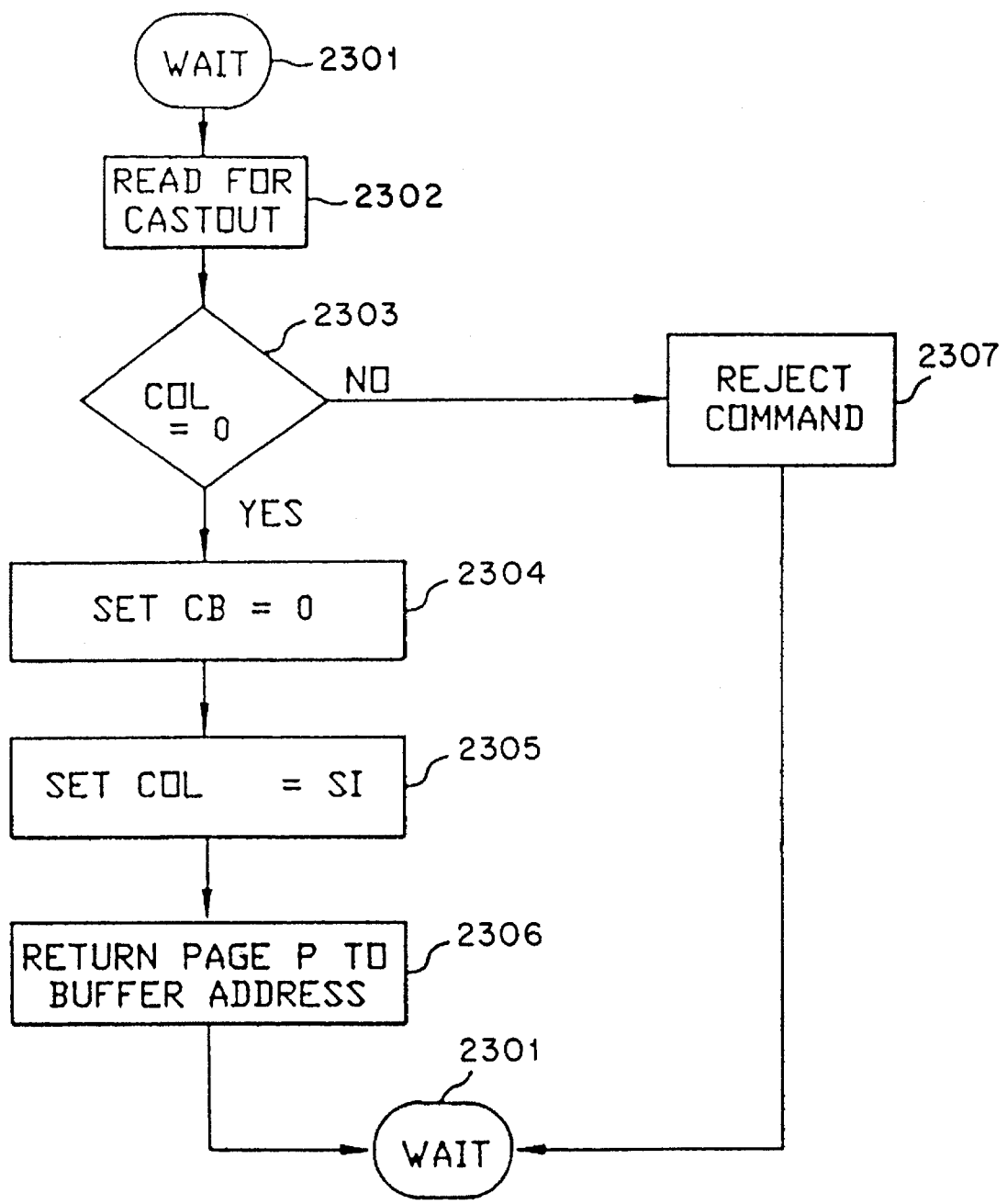
FIG. 23 is a flow diagram representing process flow for an read for castout command in support of non-blocking castout protocol.
Figure 25:
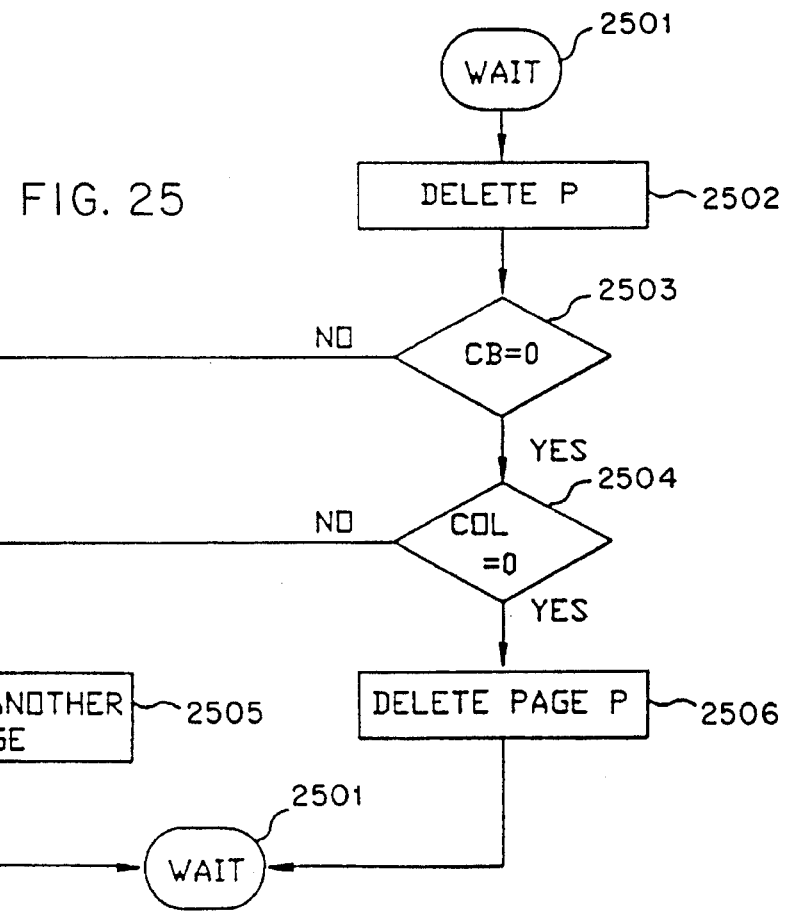
FIG. 25 is a flow diagram representing process flow for a storage reclaim process in support of non-blocking castout protocol.
Figure 26:
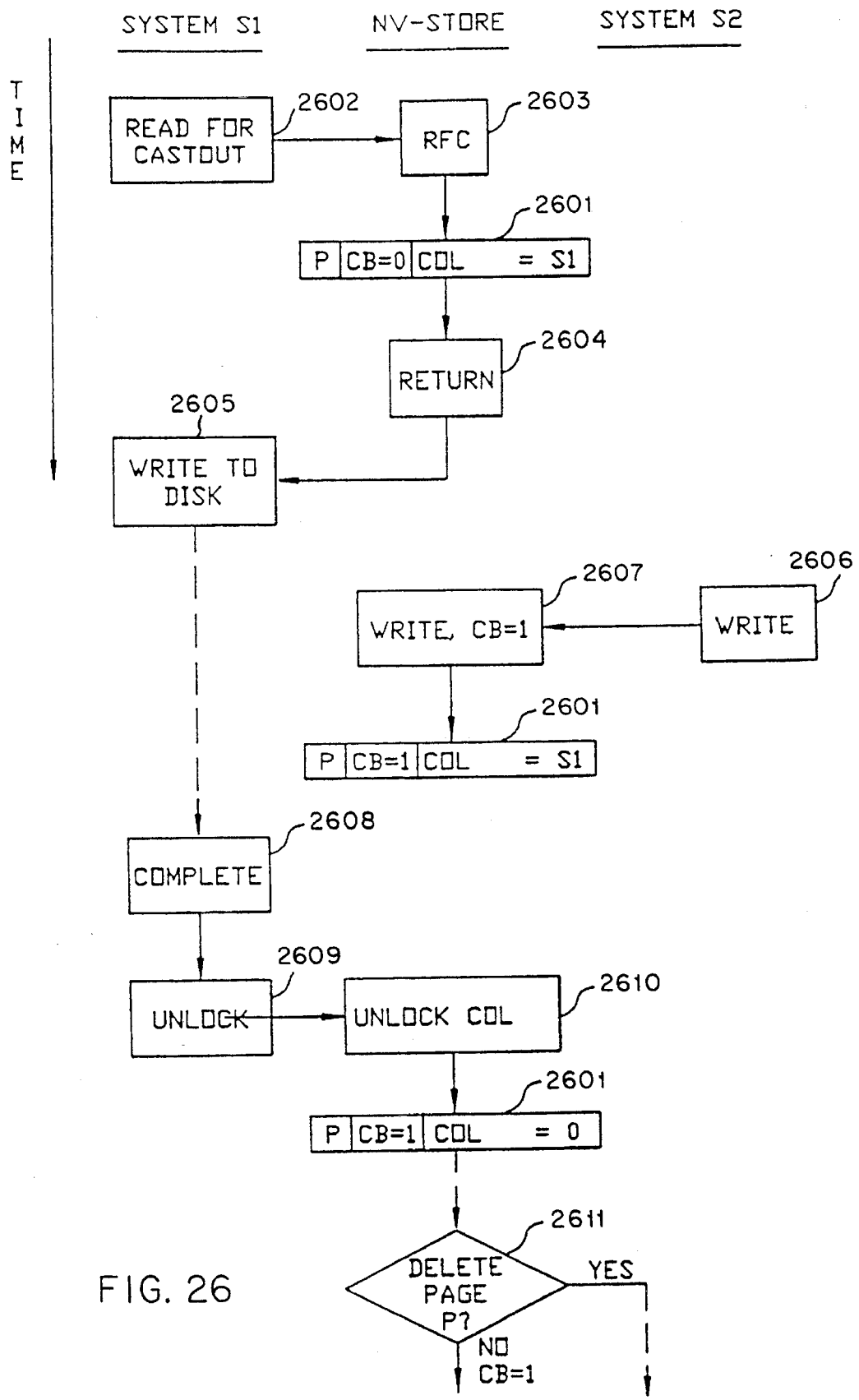
FIG. 26 is a flow diagram illustrating the method of non-blocking castout protocol for caching data in a shared cache.

The non-blocking serialization protocols for caching data in a shared cache are demonstrated using FIGS. 20, 21, 22, 23, 24, 26 and 26. In FIG. 20, a page is read using the Read and Register (RAR) command described in FIG. 11. FIG. 21 is a diagram of usage of the Write and Register (WAR) command described in FIGS. 12 and 13. Use of the Write When Register (WWR) command described in FIG. 14 as related to non-blocking serialization for castout of data from a shared cache is diagramed in FIG. 22. FIG. 23 is a diagram of usage of the Read for Castout command described in FIG. 9. Usage of the Unlock Castout Locks command described in FIG. 10 is diagramed in FIG. 24. FIG. 25 is a process representative of the reclaim function of the SES cache. In FIG. 26, a flow of the protocol is diagramed.

In FIGS. 20, 21, and 22, the collection of valid bits in the local cache register (FIG. 4, 401A, 401B, and 401C) are referred to as a system-valid-bit vector (SVBV). For this example, the SVBV can be viewed as being comprised of one bit per system attached to the cache.

| System-Valid-Bit Vector (SVBV) | One bit per system attached to the cache. If 1, the page cached in the identified system memory is valid. If 0, the page cached in the system's memory is not valid. |

Describing the collection of valid bits in the local cache register as a system valid bit vector is only a conceptual simplification for purposes of describing the following protocol. In the preferred embodiment, the individual bit entries in the system valid bit vector correspond one for one with the valid bit fields of the local cache register.

In FIGS. 20, 21, 22, 23, 24, and 26, the local cache identifier (LCID) is referred to as a system identifier (SI). The function of the SI is identical to the function of the LCID. For purposes of the following protocol, the SI is stored in the local cache controls and a field is provided in the SVBV of every entry currently in the directory and every entry thereafter made as the result of CONNECT command processing.

In the following protocol description, the function of the CONNECT command is fulfilled by the Attach-Local-Cache command. The function of the READ PAGE command is fulfilled by the Read-and-Register command (RAR) diagramed in FIG. 11. The function of the WRITE PAGE command is fulfilled by the Write-and-Register command (WAR) diagramed in FIGS. 12 and 13. The function of the CONDITIONAL WRITE command is fulfilled by the Write-When-Registered (WWR) command diagramed in FIG. 14.

These commands support non-blocking serialization to cast out a page in the multi-system data sharing complex of FIG. 1 while maintaining the page's data integrity in the face of the potential for one system to be casting out a page while another system is attempting to cache an updated version of the page. In the practice of the invention, a command whose object is a given data element (e.g. page) is serialized with other commands for the same page by the management logic (FIG. 1 at 110) in the memory (FIG. 1 at 101).

For the purposes of this protocol, the memory system 101 of FIG. 1 supports the following commands:

- a CONNECT command executed by a software system, such as an instance of a database system in the multi-system data sharing complex of FIG. 1, connecting to the NV-store 101. In response to a CONNECT command, the management logic 110 enters the identification of the connecting system into the Local Cache Controls 105 and provides a field for the connecting system in the SV bit vector of every entry currently in the directory 102 and every entry thereafter made.

- READ PAGE (S, P, Buffer Address), where S identifies the system issuing the command, P identifies the requested page, and Buffer Address denotes the address in the buffer of the system where the page is to be delivered.

- WRITE PAGE (S, P, CB=1, Buffer Address) This command is also referred to as an "unconditional" WRITE. When a WRITE PAGE command is issued, the parameters input with the command include a C parameter corresponding to the C field for the identified page. The updated nature of the page being written is indicated by setting the change bit to 1.

- CONDITIONAL WRITE (S, P, CB=0, Buffer, Address) The CONDITIONAL WRITE command is used to "cast in" or enter into the NV-store a page which the conditionally writing computer system has obtained from the secondary storage. C=0 indicates that the page is unmodified.

- READ FOR CASTOUT (S,P, Buffer Address) This command initiates castout processing for page P. To cast out page P, the DBMS in system S requests the management logic to send P from NV-store to the Buffer Address in system S. The system then writes the page to disk. After disk I/O, the DBMS issues the UNLOCK-CASTOUT ID command.

- UNLOCK-CASTOUT ID (S,P) This command tells NV-store that the page P has been successfully written to secondary storage (cast out).

Read Page:

In FIG. 20, the operational flow for management logic processing in response to a READ PAGE command is illustrated. Initially, the management logic 110 is in a WAIT state 2001 from which it can exit to any one of at least three processes, including the UNCONDITIONAL WRITE, CONDITIONAL WRITE, or READ PAGE processes. In FIG. 20, it is assumed that a READ command having the form illustrated above has been received. This is signified by READ process step 2002. In providing a READ PAGE command, the issuing computer system identifies itself (SI, that is, the ith system) the requested page (P), and the Buffer Address in the computer system to which the read page is to be delivered. The read process undertaken by the management logic 110 has three possible cases.

The first case occurs if an entry for the identified page P exists in the directory 102 and the page's D bit is set to 1, signifying that the requested page is in the shared cache 103. These conditions are tested in decisions 2003 and 2004, respectively. Assuming the positive exit from both decisions, the read process sets the bit corresponding to the identified ith computing system (SI) in the SV bit vector of the entry to 1 in step 2005, returns the data page at the specified Buffer Address in step 2006, and returns a cache hit indication in step 2007.

The significance of this case is that any time a read request is issued for a page which is already in the shared cache 103, the page will be unconditionally returned to the requestor with a cache hit indication. The S bit for the requestor is conditioned to a first state (1) in order to indicate that the copy of page P possessed by the system is current.

In the second case, it is assumed that an entry exists for the page P in the directory 102, but that the page has not yet been entered in the shared cache 103. In this case, following the read page step 2002, the positive exit is taken from the decision 2003 and the negative exit from the decision 2004. Now, the S bit for the requesting system is conditioned to the first state (that is, to a "1") and a cache miss is issued. In this case, a previous READ PAGE command has been received by the management logic 110 resulting in creation of a directory entry, but the page has not yet been brought up from DASD and put into the shared cache.

In the last case, a directory entry for page P does not exist, and management logic 110 follows the negative exit from the decision 2003 and executes steps 2010, 2011, and 2012 in sequence. In this regard, in step 2010, the management logic creates a directory entry for the page P (assuming available storage), initially conditions the entire SV bit vector for the created entry to a second state (preferably, "0"). Then, the D bit is set to 0, CB is set to 0, and the S bit for the requesting system is conditioned to the first state. Last, a cache miss is issued in step 2009 and the logic enters the wait state.

In this last case, system SI has lodged the first READ request for page P; any following READ request before the page is entered into the shared cache 103 will follow procedure steps 2002, 2003, 2004, 2008, 2009. Once the requested page has been moved up to the shared cache 103 from DASD, a READ request will follow steps 2002, 2003, 2004, 2005, 2006, 2007.

Write Page:

The process employed by the management logic for writing an updated page to the shared cache 103 is illustrated in FIG. 21. A page may be updated after being retrieved from the shared cache 103 by a READ PAGE command. Alternately, a page may be updated after being obtained from a DASD, but before the page is ever entered into the shared cache 103. Assume that system SI has acquired the page P, has updated the page, and now must write the page into the shared cache 103. System SI will issue the WRITE command with CB=1 to write the updated page P. The processing undertaken by management logic in response to this WRITE command is illustrated in FIG. 21.

In FIG. 21, there are three possible cases: an entry for the page P exists in the directory 102 and D=1 (the page is in the shared cache 103); the entry for page P exists, but the page has not yet been entered in any form into the shared cache 103; or, an entry does not exist for the page P in the directory.

In the first case, the write process undertaken by the management logic 110 (FIG. 21) moves through the sequence 2102, 2103, 2104 and then executes steps 2105, 2106, 2107, and 2108 In step 2105, the CB field of the directory entry for page P is set to 1. Next, in step 2106, the existing version of page P is overwritten with the data at the Buffer Address provided with the WRITE command. Then, all S bits in the SV BIT VECTOR for the page's data entry are set to 0 except the S bit for the system issuing the WRITE command. Upon exiting step 2107, the management logic returns an acceptance of the command to the requesting system in step 2108 and then enters the wait state 2101.

In the second case, where there is a directory entry for the page P, but the page is not in the shared cache, the management logic process 110 moves from the wait state 2101 through steps 2102 and 2103, takes the negative exit from decision 2104, and executes steps 2109, 2110, 2111, 2107 and 2108. In step 2109, the change bit in the directory entry for the requested page is set to 1. In step 2110, space is allocated for page P in the shared cache 103, the data is moved to the allocated space from the Buffer Address of system SI, and the cache address of the page is placed in the page address field of the page's directory entry. Next, in step 2111, the data bit is set to 1 in page P's directory entry and step 2107 is executed, following which the logic returns an acceptance of the command and enters the wait state 2101.

In the last case, when there is no directory entry for page P, the negative exit is taken from the decision 2103 and steps 2112–2116 and 2108 are executed, following which the logic enters the wait state 2101. In step 2112, a directory entry is created for page P, and in step 2113, space is allocated in the shared cache for entry of the page. In steps 2114 and 2115, relevant bits in the directory entry are conditioned. In step 2113, all bits in the page's SV bit vector are initialized to 0 and the D bit is set to 1. Next, in step 2115, the S bit for the requesting system (bit SI) is conditioned to a 1 and the change bit is also set to a 1, indicating that the page has been changed, and the page's address is placed in the entry. In step 2116, the directory entry for page P is entered into the directory and the page is placed into the cache at the allocated location. The logic then returns an acceptance and enters the wait state.

It is observed that the write process of FIG. 21 is unconditional in that the request is never rejected. Further, execution of any one of the WRITE cases will result in setting the change bit for the affected page and zeroing all bits of the SV bit vector for the affected page, save the bit for the writing computer system. As will be seen from the following description of the CONDITIONAL WRITE, zeroing the S bits for non-writing computer systems during a WRITE will prevent entry of down-level pages into the shared cache.

Conditional Write:

Refer now to FIG. 22 for an understanding of the CONDITIONAL WRITE processing embodied in the management logic 110. In this processing, it is assumed that system SI has received a cache miss from the NV-store and has then obtained a page from the secondary storage, has not changed it, and is preparing to cache it in the shared cache 103. In the parameter set sent to the management logic 110,; system SI sets the change bit to 0, which signifies that the page in the possession of the computer system is equivalent to the secondary storage version of the page. System SI issues a CONDITIONAL WRITE command with CB equal to 0. Again, there are three cases.

In the first case, a directory entry for the page and the page itself exist in the cache. The directory 102 is checked for an entry corresponding to page P. Assuming the page is in the directory, the positive exit is taken from step 2203 and in step 2204 the data bit of the entry is checked to determine whether the page is in the cache. Assuming the positive exit from decision 2204, the page would be in the cache. At this point, the S bit for system SI is checked in the SV bit vector of the page entry to determine whether another system has changed the page. If bit SI is set to 1, no change to the page has occurred and the positive exit is taken from decision

2205. Now, the management logic 110 has determined that the page is in the cache, that the page submitted by SI is equivalent to the page in the cache, and that no overwriting of the page is required. Thus, the management logic 110 will return the appropriate code to signify acceptance of the CONDITIONAL WRITE in step 2206. Note, however, that no data will be transferred from the memory of the system SI to the shared cache 103. The logic then enters the wait state. If the negative exit is taken at decision 2205, then the command is rejected in step 2211 and the logic enters the wait state.

In the second case, a directory entry exists for page P and the positive exit is taken from step 2203. However, assume that in step 2204 the management logic 110 determines that the page is not in the cache and takes the negative exit from decision 2204, next encountering decision 2207. In decision 2207, bit SI of the SV bit vector for page P is checked. If the bit has been set to 1, system SI is in possession of a valid page. At this point, the positive exit is taken from the decision 2207. Space is allocated in the shared cache and the page data is moved from the Buffer Address of system SI to the allocated space. In step 2209, the D bit is set to 1 and the CB bit is set to 0. In step 2210, the page address is set in the directory entry and the entry is placed in the directory. Last, the management logic returns an acceptance of the CONDITIONAL WRITE to system SI and enters the wait state.

In this case, assume that the outcome of the decision at 2207 is negative. Now, system SI is not in possession of a valid page and the conditional write processing is terminated through step 2211, the management logic 110 returning the rejection of the CONDITIONAL WRITE command to system SI and then entering the wait state 2201.

Last, if the management logic determines in response to a received CONDITIONAL WRITE command that no entry has been made for page P in the directory 102, the negative exit is taken from decision 2203, command processing is terminated and the command is rejected in step 2211, the management logic then entering the wait state 2201.

With these commands, it should be obvious that the SV bit vector and change bit fields effectively serialize the casting in of pages to the shared cache 103 with the guarantee that, once a page is cast in and changed, a later down-level version of the page obtained from the secondary storage will not overwrite an updated version of the page in the shared cache. The guarantee is advanced by the non-blocking serialization protocol for moving a page obtained from secondary storage into the shared cache. The protocol works well because the NV-store begins tracking caching of the page (in the SV bit vector) at the first READ PAGE command issued, even if the command results in a cache miss owing to the absence of the directory entry or data. An unconditional WRITE command by another system will set the change bit for page P and reset the S bit of all systems other than the writing system in the page's SV bit vector. Processing of a subsequent CONDITIONAL WRITE command will key on: a) the writing system's S bit in the SV bit vector; or, b) absence of a directory entry for the page. The NV-store rejects the CONDITIONAL WRITE command in both cases.

Once an updated page is written to the cache 103, the problem remains how to ensure that a version of the page being cast out does not cause deletion of a more current version of the page in the shared cache. The invention utilizes the READ FOR CASTOUT and UNLOCK CASTOUT LOCK commands in a protocol which guarantees that the castout operation in the multi-system, data-sharing complex of FIG. 1 will not delete from the shared cache 2103 an updated version of a page when a previous version of the page is being cast out to secondary storage. This guarantee is effective even in the face of a possibility that the page may be updated while castout is occurring.

Read for Castout:

The command processing in the READ FOR CASTOUT command is illustrated in FIG. 23. Initially, the management logic 110 is in the wait state 2301 from which it transitions in response to a receipt of a READ FOR CASTOUT command from system SI for page P. In response to receipt of the command, the management logic checks the CO field of the directory entry for page P. If the CO field is empty (preferably denoted by a value of 0), the management logic takes a positive exit from decision 2303, sets the CB field in the directory entry for page P to 0 in step 2304, and enters the identification of the requesting system into the CO field of the entry in step 2305. The logic then returns the copy of page P which is in shared cache 103 to the Buffer Address specified in the command parameter set in step 2306 and enters the wait state at 2301. At this point, the DBMS in system SI will begin a process for writing the version of page P in its buffer to the secondary storage.

The negative exit from decision 2303 provides for the possibility that another system is conducting a castout operation, in which case the CO field value will be non-zero and the negative exit will be followed from decision 2303. If the CO field is non-zero, system is conducting a cast out operation and the management logic 110 will reject the command in step 2307 and return to the wait state 2301.

Figure 24:
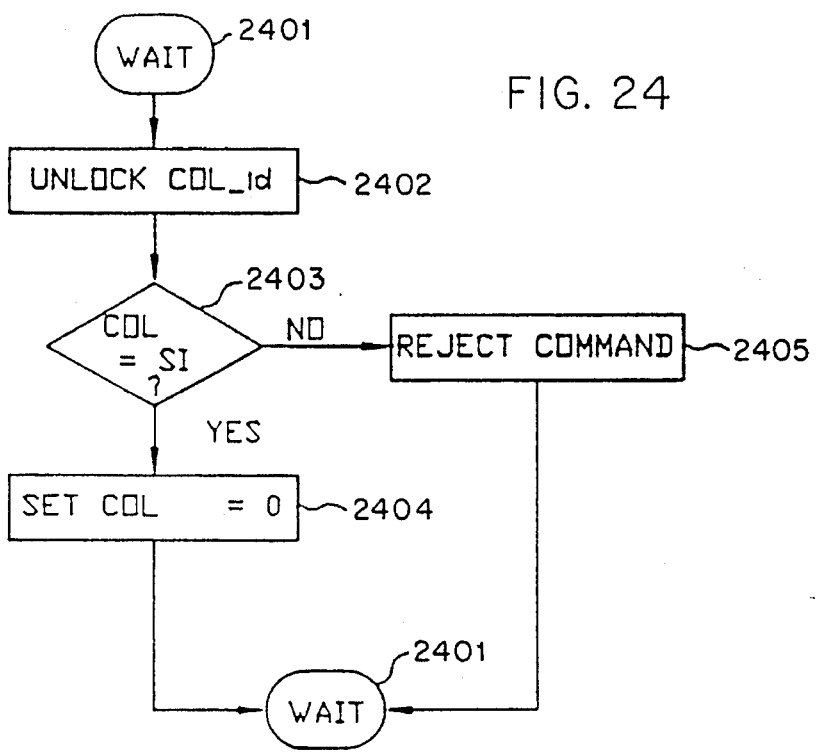
FIG. 24 is a flow diagram representing process flow for a unlock castout lock command in support of non-blocking castout protocol.

Unlock Castout Lock:

FIG. 24 illustrates management logic processing for the UNLOCK CASTOUT LOCK command. Initially, the management logic 110 is in the wait state 2401. Upon receiving the UNLOCK CASTOUT LOCK command (UNLOCK CO) in step 2402, it compares the entry in the CO field of page P with SI, the identification of the system issuing the command. Equality of the values signifies that the requesting system is the one which initiated the cast out process with a READ FOR CAST OUT command. If the values are equal, the positive exit is taken from decision 2403, the CO field is set to 0 in step 2404, and the management logic enters wait state 2401. Admitting the possibility of a software error in non-equality of the CO and system id values, the negative exit is provided from decision 2403 leading to rejection of the command in step 2405 and re-entry of the wait state 2401.

Delete Page:

FIG. 25 shows processing for deletion of a page which has been cast out by use of the commands illustrated in FIG. 23 and 24. Relatedly, "deletion: means removal of a directory entry and appropriation of the cache space pointed to by the directory. The inventors contemplate that any appropriate DELETE process which is internal in the management logic 110 would be employed to appropriate cache space holding page P and to remove its associated directory entry from the directory. Necessarily, the delete process would depend upon completion of a READ FOR CASTOUT/UNLOCK CASTOUT LOCK sequence, following which the castout page P would be deleted. FIG. 25 illustrates how the castout process provides against deletion of a page which has been updated by a WRITE command during the castout process. FIG. 25 does not assume that the deletion necessarily immediately follows the castout.

In FIG. 25, a DELETE process is invoked internally in the management logic 110 to delete page P from the shared cache 103 when a directory entry has to be created and no free entry is available. This is step 2502. The delete processing would first inspect the CB field of the directory entry for page P and then the CO field of the entry. These are decisions 2503 and 2504. In decision 2503, if the change bit has been set to 1, the inference drawn is that the version of page P in the shared cache and the version in secondary storage are inconsistent, in which case, castout processing to write the shared cache version to secondary storage would have to be initiated. In this case, the negative exit is taken from decision 2503. In decision 2504, it is possible that a castout process has begun by execution of a READ FOR CASTOUT command but that the process has not been completed by execution of the following UNLOCK CASTOUT LOCK. In this case, the CO field would be non-zero and the delete process would terminate by following the negative exit from decision 2504. The negative exits from decisions 2503 and 2504 join in step 2505 in which the entry would not be deleted. Assuming the positive exit from each of the decisions 2503 and 2504, the conditions of consistency between shared cache and secondary storage versions and completion of a castout process would be met and the directory entry for the page P would be deleted in step 2506 from the directory 102. At this time, the appropriate cache management policy could be invoked to steal the cache space allocated to the page P.

Flow of Non-Blocking Castout Process:

FIG. 26 shows the operation of a castout process employing the READ FOR CASTOUT (RFC) and UNLOCK CASTOUT LOCK (UNLOCK) commands. The guarantee of consistency between tile shared cache and secondary storage versions of the page P is illustrated in the operation by a WRITE command which occurs between the RFC and UNLOCK commands. The operation is illustrated with reference to a representation of a directory entry for page P which shows only the page identification P, the change bit CB, and the CO fields for the entry. The directory entry for page P is indicated by reference numeral 2601. In addition, time unfolds vertically along the arrow marked TIME.

In FIG. 26, assume system S1 begins a castout process by issuing a READ FOR CASTOUT command 2602 which initiates the RFC processing illustrated in FIG. 23. In processing the command, the NV-store management logic sets the change bit to 0 and enters the identification of system 1 (S1) in the CO field of page P's directory entry. The management logic returns a copy of page P from the shared cache to the buffer of system S1. System S1 then at 2605 initiates a WRITE TO DISK I/O process for entering the copy of page P into the secondary storage. In the meantime, system S2 executes a WRITE command 2606 after the RFC process has been completed, but before the WRITE TO DISK process 2605 has been completed. System S2 indicates a CB value of 1 for the directory entry of page P and the CB field of the entry 2601 is changed to this value during the WRITE process 2607 conducted by the management logic according to FIG. 21. At this point, an updated version of page P which is being written to secondary storage exists in the shared cache, introducing inconsistency between it and the version being cast out by system S1.

Some time after execution of the WRITE command 2606, the WRITE TO DISK 2605 at system S1 is completed (2608). Now, system S1 issues an UNLOCK CASTOUT LOCK command 2609, initiating corresponding processing by the management at 2610. During the processing 2610, the management logic zeros the CO field of the directory entry 2601, which unlocks page P for another castout process. The key point to note is that the UNLOCK CASTOUT LOCK command does not cause the CB field in directory entry 2601 to be reset. This prevents the management logic 110 from deleting page P as shown in FIG. 25. The newer version of P would be cast out by the castout process initiated later by S1 or S2. Thus, if the management logic attempts in step 2611 to delete page P, deletion of page P is prevented and another page is considered for deletion.

Many variations and modifications which do not depart from the scope and spirit of the invention will now become apparent to those of skill in the art. Thus, it should be understood that the above described embodiments have been provided by way of example rather than as a limitation.

Having thus described our invention, what we claim as new and desire to secure by Letters Patent is:

1. A method of controlling data transfer from shared storage to I/O devices in a computer complex, comprising the steps of:

structuring a sysplex to include a plurality of central processor complexes (CPCs), in which the CPCs use I/O control software for controlling sysplex direct access storage devices (sysplex DASDs) connected using first data paths to the CPCs for storing data items permanently in the sysplex, and a shared electronic storage (SES) connected using second data paths to the CPCs, wherein said first data paths are separate and distinct from said second data paths, in which the CPCs use SES control software for controlling SES over said second data path, designating by said SES control software castout classes for SES cache directory entries to associate the castout classes with changed data items represented by the directory entries for enabling transfer to DASD in a single I/O operation of a plurality of data items selected from a castout class.

2. A method of controlling data transfer from shared storage to I/O devices in a computer complex as defined in claim 1, comprising the step of:

associating, using said I/O control software for controlling sysplex DASDs, castout classes designated for SES cache directory entries with identifications of sysplex DASD for locating a DASD for receiving a potential castout of data items associated with a respective castout class.

3. A method of controlling data transfer from shared storage to I/O devices in a computer complex as defined in claim 1, comprising the steps of:

associating a castout lock representation with each SES cache directory entry for a data item stored in a SES cache data area, and setting the castout lock representation to a castout or non-castout state, in which the non-castout state has a predetermined value, and the castout state has a different value identifying a castout process used for transferring the associated data item to DASD.

4. A method of controlling data transfer from shared storage to I/O devices in a computer complex as defined in claim 3, the method further comprising the step of:

setting an indicating means for any valid SES cache directory entry to indicate a version of an associated data item stored in SES has been changed during a castout of the data item to DASD and the SES data item is not to be deleted from SES as long as the SES version is different from a version of the same data item stored in a sysplex DASD.

5. A method of controlling data transfer from shared storage to I/O devices in a computer complex as defined in claim 4, while the castout lock representation has the predetermined value indicating no castout state exists, the method further comprising the step of:

providing a change flag field in each directory entry in which the change flag field indicates whether or not an associated data item is stored in the SES cache with a version different from a version of the same data item stored in a sysplex DASD.

6. A method of controlling data transfer from shared storage to I/O devices in a computer complex as defined in claim 5, comprising the step of:

inhibiting reclaiming of a SES cache directory entry in a castout class when the change flag field indicates a different version is stored in the SES cache.

7. A method of controlling data transfer from shared storage to I/O devices in a computer complex as defined in claim 3, comprising the step of:

inhibiting reclaiming of a SES cache directory entry in a castout class when the castout lock representation indicates a castout state exists for the entry.

8. A method of controlling data transfer from shared storage to I/O devices in a computer complex as defined in claim 3, while the castout lock representation indicates a castout state exists and the change flag field indicates a changed state, the method further comprising the step of:

setting the change flag field to its non-changed state when the castout lock representation is set to provide a combinatorial indication (combining the indications for the change flag field and castout lock representation) indicating that a changed state exists for the version of the data item in the SES cache in relation to a DASD version of the same data item.

9. A method of controlling data transfer from shared storage to I/O devices in a computer complex as defined in claim 1, comprising the steps using said SES control software of:

counting entries in each castout class, and initiating a castout process for a castout class when the number of SES cache directory entries counted for the castout class has reached a predetermined threshold number.

10. A method of controlling data transfer from shared storage to I/O devices in a computer complex as defined in claim 9, comprising the step of:

providing a counter means for each castout class which is incremented by each CPC write command specifying a castout class and writing a new data item in the castout class in SES, for which the counter means provides a measurement of the number of SES data items currently existing in each castout class.

11. A method of controlling data transfer from shared storage to I/O devices in a computer complex as defined in claim 10, comprising the steps of:

signalling by a timer program of the expiration of each time interval used for indicating the number of changed data items in each castout class currently measured by each castout-class counter means in a SES cache, performing a measurement operation for measuring the number of changed data items currently existing in each castout class in a SES cache in response to a signal by the signalling step, and initiating a castout process for any castout class which has the changed number of SES cache directory entries indicated by the measurement operation as equal to or exceeding a predetermined threshold number for the castout class.

12. A method of controlling data transfer from shared storage to I/O devices in a computer complex as defined in claim 10, comprising the steps of:

issuing of a write command by a CPC to a SES cache specifying a castout class for a data item, and responding to the CPC command by SES sending a count of the number of data items stored in the specified castout class in the SES cache and the total number of data items in all castout classes in the SES cache.

13. A method of controlling data transfer from shared storage to I/O devices in a computer complex as defined in claim 1, comprising the steps of:

transmitting by a CPC to a SES cache of a command containing a name, a data item, a changed state indication, and a castout class for the data item, accessing a directory entry in the SES cache having the name of the data item, and setting in the directory entry a change flag field to the changed state indication for the data item, and setting a castout class field to the castout class for the data item being stored in SES regardless of whether a castout class was previously designated in the entry as changed or non-changed for the data item.

14. A method of controlling data transfer from shared storage to I/O devices in a computer complex as defined in claim 13, comprising the steps of:

transmitting a read-castout-class command from a CPC to a SES cache specifying a castout class, accessing in SES of the queue for the castout class, and finding a data item having a representation in the castout class.

15. A method of controlling data transfer from shared storage to I/O devices in a computer complex as defined in claim 14, comprising the steps of:

transmitting with the command of a name and a name mask to represent a set of related names potentially in the directory, finding one or more names in a set defined by the mask applied to the name in a specified castout class, and sending by SES to the CPC issuing the command of a list containing the set of names obtained by the finding step to inform the CPC of specific names in the castout class.

16. A method of controlling data transfer from shared storage to I/O devices in a computer complex as defined in claim 15, comprising the step of:

ordering the names found by the finding step in a recency of write-access sequence, and the sending step sending to the CPC the list of names in the recency of write-access sequence.

17. A method of controlling data transfer from shared storage to I/O devices in a computer complex as defined in claim 15, comprising the step of:

also sending by SES to the CPC of a count of the number of data items currently in the list being sent.

18. A method of controlling data transfer from shared storage to I/O devices in a computer complex as defined in claim 1, comprising the steps of:

transmitting a read-castout-class-information command from a CPC to a SES cache for requesting values in a set of counters accumulated in SES for respective predefined events occurring in relation to castout classes to enable the CPC to control a castout operation, and responding by SES to the command by sending to the CPC of current values in the counters requested by the command.

19. A method of controlling data transfer from shared storage to I/O devices in a computer complex as defined in claim 1, comprising the steps of:

transmitting a read-directory command from a CPC to a SES cache for requesting information on one or more named data items, scanning the entries in the SES cache directory for entries indicating a changed data item in SES (changed entries) for generating a name list or a list of directory-entry-information-blocks without being affected by changes to directory entries during the scanning step, and responding to the command by SES sending to the CPC the name list or the list of directory-entry-information-blocks.

20. A method of controlling data transfer from shared storage to I/O devices in a computer complex as defined in claim 19, the responding step further comprising:

specifying a name and name mask in a read-directory command to define a set of related names for the scanning step to find entries in the directory for generating the name list or the list of directory-entry-information-blocks.

21. A method of controlling data transfer from shared storage to I/O devices in a computer complex as defined in claim 19, the responding step further comprising:

providing in each directory-entry-information-block for an associated data item of: the name, change state, castout class, and castout lock state found in the directory entry for the data item.

22. A method of controlling data transfer from shared storage to I/O devices in a computer complex as defined in claim 1, further comprising the steps of:

transmitting by a CPC to a SES cache of a read-for-castout command containing a name of a data item being requested for castout, testing in a directory entry in the SES cache for the name in the command, for a non-locked state in a castout lock field, and for a changed state indication for an associated data item, and setting in the directory entry (when the conditions stated for the testing step are found) of the castout lock field to identify a castout process, the change field to indicate a non-changed state for the data item, and transmitting the data item to the CPC for the LCB.

23. A method of controlling data transfer from shared storage to I/O devices in a computer complex as defined in claim 22, further comprising the step of:

responding with a copy of the castout lock field and without transmitting the associated data item to the CPC when the castout lock field indicates a locked state.

24. A method of controlling data transfer from shared storage to I/O devices in a computer complex as defined in claim 23, further comprising the steps of:

transmitting by a CPC to a SES cache of a unlock-castout-locks command containing a list of one or more names of data items being requested for unlocking, comparing an identifier of the CPC sending the command with a CPC identifier in a castout lock field for each directory entry found for a name in the list, and accepting the command by resetting the castout lock field to a predetermined value indicating an unlocked state if the comparing step finds equality, but rejecting the command without changing the castout lock field if the comparing step finds inequality.

25. A method of controlling data transfer from shared storage to I/O devices in a computer complex as defined in claim 24, further comprising the step of:

forcing a change field in a directory entry to indicate a changed state for an associated data item if a requested castout operation for the data item is unsuccessful.

26. A method of controlling data transfer to I/O in a computer complex as defined in claim 24, further comprising the step of:

responding with a list locator representation when a rejection of a command occurs for a name in the list to enable the CPC to recognize it need not castout the data item, or to later again request a castout of the data item.

27. A method of controlling data transfer from shared storage to I/O devices in a computer complex as defined in claim 22, further comprising the step of:

registering an LC identifier (when registration is selected by the program) to indicate the local cache buffer used to store the data while in transit to DASD, to affect a read and register operation to the local cache and a castout operation in a single data transfer from SES to the CPC.

28. A method of controlling data transfer from shared storage to I/O devices in a computer complex as defined in claim 22, further comprising the steps of:

suppressing registration of an LCB identifier (when suppression of registration is selected by the program) to allow the castout operations to bypass the local-cache buffers.

29. A method of controlling data transfer to I/O in a computer complex as defined in claim 1, further comprising the steps of:

transmitting by a CPC to a SES cache of a command containing a name for finding any SES directory entry having the same name associated with a data item stored in the SES cache, and putting a representation of the directory entry at an end of a castout queue for the castout class designated for the associated data item, the representation being put at a most recently changed (MRC) end of the queue to have the queue order its representations in recency order of data items changed in the castout class, with the least recently changed (LRC) data item in the castout class being indicated at the opposite end of the queue.

30. A method of controlling data transfer to I/O in a computer complex as defined in claim 29, further comprising the step of:

providing a write command as the command referencing a directory entry having a representation in the castout class.

31. A method of controlling data transfer to I/O in a computer complex as defined in claim 30, further comprising the step of:

providing a write and register command or a write when registered command referencing a directory entry having a representation in the castout class.

32. A method of controlling data transfer to I/O in a computer complex as defined in claim 30, further comprising the steps of:

rejecting the write command if the command represents a no-change state for a transmitted data item and a directory entry is found for the name of the data item in the command which indicates a changed state, and responding to the CPC issuing the command with a rejection signal indicating the command is incompatible with the change state in the directory entry.

33. A method of controlling data transfer from shared storage to I/O devices in a computer complex, comprising the steps of:

structuring a sysplex to include a plurality of central processor complexes (CPCs), in which the CPCs use I/O control software for controlling sysplex direct access devices (sysplex DASDs) connected to the CPCs for storing data items permanently in the sysplex, and a shared electronic storage (SES), in which the CPCs use SES control software for controlling the SES, designating by said SES control software castout classes for SES cache directory entries to associate the castout classes with changed data items represented by the directory entries for enabling transfer to DASD in a single I/O operation of a plurality of data items selected from a castout class, associating a user-data field with each SES cache directory entry in which to indicate the time of initially writing an associated data item in the SES cache, and writing a time in the user-data field when a change flag field is set in the directory entry to indicate that the associated data item is different from a copy of the same data item in the sysplex DASD.

34. A method of controlling data transfer from shared storage to I/O devices in a computer complex as defined in claim 33, the writing step further comprising:

using the user-data field to control backup by indicating a time from which backup is needed in case of failure of the SES cache.

35. A method of controlling data transfer from shared storage to I/O devices in a computer complex as defined in claim 33, the detecting step further comprising:

retrieving by a CPC of the time of change of a data item in a user-data field of a SES directory entry to reduce recovery time for a SES cache after failure of the SES cache.

* * * * *

UNITED STATES PATENT AND TRADEMARK OFFICE
CERTIFICATE OF CORRECTION

PATENT NO. : 5,493,668
DATED : Feb. 20, 1996
INVENTOR(S) : David A. Elko et al.

It is certified that error appears in the above-indentified patent and that said Letters Patent is hereby corrected as shown below:

Column 15, line 36    After "(DAS)" insert --(307)--.

Signed and Sealed this

Twenty-seventh Day of August, 1996

Attest:

BRUCE LEHMAN

*Attesting Officer*    *Commissioner of Patents and Trademarks*